(12) United States Patent
Miyagishi et al.

(10) Patent No.: US 12,182,457 B2
(45) Date of Patent: Dec. 31, 2024

(54) INK JET SYSTEM

(71) Applicant: SEIKO EPSON CORPORATION, Tokyo (JP)

(72) Inventors: Akira Miyagishi, Shiojiri (JP); Toshiro Murayama, Fujimi-Machi (JP); Nobuaki Ito, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/519,185

(22) Filed: Nov. 27, 2023

(65) Prior Publication Data

US 2024/0176552 A1    May 30, 2024

(30) Foreign Application Priority Data

Nov. 29, 2022    (JP) ................................. 2022-190482

(51) Int. Cl.
*G06F 15/00*    (2006.01)
*B41J 2/045*    (2006.01)
*G06F 3/12*    (2006.01)

(52) U.S. Cl.
CPC ........ *G06F 3/1203* (2013.01); *B41J 2/04553* (2013.01); *B41J 2/04566* (2013.01); *B41J 2/04581* (2013.01); *G06F 3/1229* (2013.01); *G06F 3/1236* (2013.01); *G06F 3/1285* (2013.01)

(58) Field of Classification Search
None
See application file for complete search history.

(56) References Cited

U.S. PATENT DOCUMENTS

| | | | | |
|---|---|---|---|---|
| 2013/0135397 | A1* | 5/2013 | Nishimura | B41J 2/04525 347/57 |
| 2013/0314466 | A1* | 11/2013 | Ito | B41J 2/16508 347/17 |
| 2016/0216864 | A1* | 7/2016 | Miyazaki | H04N 1/00941 |

FOREIGN PATENT DOCUMENTS

JP        2015-157426 A        9/2015

* cited by examiner

*Primary Examiner* — Mark R Milia
(74) *Attorney, Agent, or Firm* — WORKMAN NYDEGGER

(57) ABSTRACT

An ink jet system includes a recording apparatus with a head unit that ejects ink, a processing apparatus that performs data processing for causing the recording apparatus to perform a recording operation, and a server connectable to either the recording apparatus or the processing apparatus. A first storage unit is disposed in either the recording apparatus or the processing apparatus. A second storage unit is disposed in the server. An acquiring section acquires first data during the recording operation, an accepting section accepts first selection information indicating a result of having a user select any one or more of the first storage unit and the second storage unit to store the first data, and a storing section that stores the first data to the selected one or more of the first storage unit and the second storage unit based on the first selection information.

11 Claims, 14 Drawing Sheets

INK JET SYSTEM

The present application is based on, and claims priority from JP Application Serial Number 2022-190482, filed Nov. 29, 2022, the disclosure of which is hereby incorporated by reference herein in its entirety.

BACKGROUND

1. Technical Field

The present disclosure relates to an ink jet system.

2. Related Art

A recording apparatus is provided, to which a head unit that ejects ink such as liquid is attached, and that performs a recording operation on a recording medium is provided. The recording apparatus is an ink jet printer or the like. For example, JP-A-2015-157426 discloses a recording apparatus having a storage unit.

For the existing technique described above, it is conceivable to connect, to a server, either a recording apparatus or a processing apparatus that performs data processing for causing the recording apparatus to perform a recording operation, and to store data obtained during the recording operation to a storage unit included in the server. However, it is unclear whether it is appropriate for a user to store the data in a storage unit included in either the recording apparatus or the processing apparatus or in the storage unit included in the server, and it is difficult to store the data in a storage destination appropriate for the user.

SUMMARY

To solve the above-described problems, according to an aspect of the present disclosure, an ink jet system includes a recording apparatus to which a head unit that ejects ink is attached, and that performs a recording operation on a recording medium; a processing apparatus that is connected to the recording apparatus and performs data processing for causing the recording apparatus to perform the recording operation; and a server connectable to either the recording apparatus or the processing apparatus. A first storage unit is disposed in either the recording apparatus or the processing apparatus, and a second storage unit is disposed in the server. The ink jet system further includes an acquiring section that acquires first data during the recording operation; an accepting section that accepts first selection information indicating a result of having a user select any one or more of the first storage unit and the second storage unit to store the first data; and a storing section that stores the first data to the selected one or more of the first storage unit and the second storage unit based on the first selection information.

DESCRIPTION OF EMBODIMENTS

Hereinafter, embodiments of the present disclosure are described with reference to the drawings. However, in each of the drawings, dimensions and scale of components are different from the actual dimensions and scale of the components. In addition, since the embodiments described below are specific examples of the present disclosure, various technically preferable limitations are provided in the embodiments. However, the scope of the present disclosure is not limited to the embodiments unless it is stated that the present disclosure is limited in the following description.

1. First Embodiment 1-1. Overview of Ink Jet System 100

Figure 1:
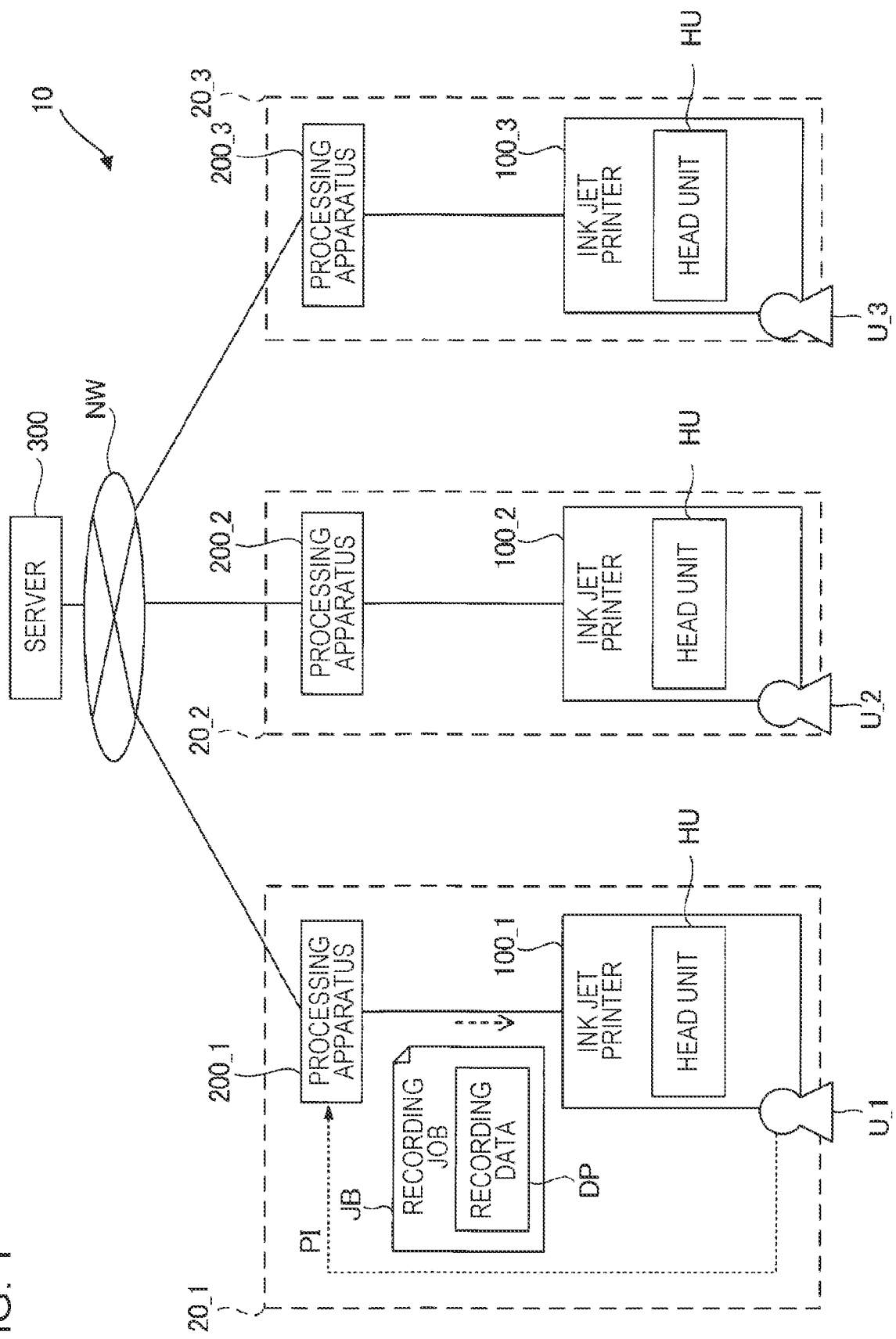
FIG. 1 is a schematic diagram illustrating an example of a configuration of an ink jet system according to a first embodiment.

FIG. 1 is a schematic diagram illustrating an example of a configuration of an ink jet system 10 according to a first embodiment. The ink jet system 10 is a system that performs recording on a recording medium PP by an ink jet method. The recording medium PP is described below. In the example illustrated in FIG. 1, the ink jet system 10 includes ink jet printers 100_1 to 100_3, processing apparatuses 200_1 to 200_3, and a server 300.

The ink jet printers 100_1 to 100_3 are apparatuses provided by a manufacturer of the ink jet printers 100_1 to 100_3. In the following description, the ink jet printers 100_1 to 100_3 may be collectively referred to as ink jet printers 100 when the ink jet printers 100_1 to 100_3 are not distinguished from each other. Each of the ink jet printers 100 is a liquid ejecting apparatus that ejects ink that is an example of liquid. The manufacturer of the ink jet printers 100 is a business operator that manufactures the ink jet printers 100. The manufacturer of the ink jet printers 100 may be hereinafter also referred to as a "printer manufacturer". The ink jet printers 100_1 to 100_3 may be provided by the same printer manufacturer or may be provided by different printer manufacturers. Head units HU incorporated in the ink jet printers 100_1 to 100_3 are provided by a manufacturer of the head units HU. The manufacturer of the head units HU is a business operator that manufactures the head units HU. The manufacturer of the head units HU may be hereinafter also referred to as a "head manufacturer". The printer manufacturer receives the head units HU provided from the head manufacturer and manufactures the ink jet printers 100 by incorporating the provided head units HU in the ink jet printers 100. Each of the ink jet printers 100 is an example of a "recording apparatus".

FIG. 1 illustrates a user U_1 who uses the ink jet printer 100_1, a user U_2 who uses the ink jet printer 100_2, and a user U_3 who uses the ink jet printer 100_3. In the following description, the users U_1 to U_3 may be collectively referred to as users U when the users U_1 to U_3 are not distinguished from each other. For example, when an operator who belongs to the printer manufacturer uses the ink jet printer 100, this operator is the user U. In addition, for example, when a third party that receives the ink jet printer 100 provided from the printer manufacturer uses the ink jet printer 100, this third party is the user U. In the following description, a third party that receives the ink jet printer 100 provided from the printer manufacturer may be referred to as an "end user". A user U_i uses an ink jet printer 100_i and a processing apparatus 200_i, where i is an integer from 1 to 3.

The ink jet printer 100_1 is communicably connected to the processing apparatus 200_1. The ink jet printer 100_2 is communicably connected to the processing apparatus 200_2. The ink jet printer 100_3 is communicably connected to the processing apparatus 200_3. The ink jet printers 100_1 to 100_3 correspond to the processing apparatuses 200_1 to 200_3, respectively, and are communicably connected to the processing apparatuses 200_1 to 200_3, respectively. In the following description, the processing apparatuses 200_1 to 200_3 may be collectively referred to as processing apparatuses 200 when the processing apparatuses 200_1 to 200_3 are not distinguished from each other.

A recording system 20_i is described below, where i is an integer from 1 to 3. The recording system 20_i includes the ink jet printer 100_i and the processing apparatus 200_i. In the following description, recording systems 20_1 to 20_3 may be collectively referred to as recording systems 20 when the recording systems 20_1 to 20_3 are not distinguished from each other. It can be said that the ink jet system 10 includes the recording systems 20_1 to 20_3 and the server 300.

In the example illustrated in FIG. 1, the number of ink jet printers 100 included in the ink jet system 10 and the number of processing apparatuses 200 included in the ink jet system 10 are 3, but are not limited to 3 and may be 1, 2, or 4 or more. That is, the number of pairs of ink jet printers 100 and processing apparatuses 200 is not limited to 3 and may be 1, 2, or 4 or more. The ink jet printer 100 accepts a recording job JB from the processing apparatus 200.

The recording job JB is a recording job for performing recording processing. The recording job JB includes identification information (not illustrated) uniquely identifying the recording job JB and recording data DP indicating an image to be formed on the recording medium PP. The recording job JB may further include information indicating the number of prints of the image to be formed on the recording medium PP. When a recording instruction PI is notified to the processing apparatus 200 by an operation of the user U, the recording job JB is generated by the processing apparatus 200. The recording instruction PI includes information identifying image data on which the recording data DP is based. The image data is in a file format such as PostScript, PDF, or XPS. PDF is an abbreviation for Portable Document Format. XPS is an abbreviation for XML Paper Specification. The information identifying the image data is, for example, a file path of the image data stored in the processing apparatus 200. The ink jet printer 100 forms the image based on the recording data DP on the recording medium PP.

The recording medium PP is not limited as long as the ink jet printer 100 can perform printing on the recording medium PP. Examples of the recording medium PP are various types of paper, various types of cloth, and various types of films.

The ink jet printer 100 includes a single head unit HU. In the following description, the head unit HU ejects the ink from nozzles N disposed in the head unit HU. Components that are among components forming the ink jet printer 100 and are not included in the head unit HU may be hereinafter referred to as a "printer body".

In the example illustrated in FIG. 1, the ink jet printer 100 includes the single head unit HU, but the number of head units HU included in the ink jet printer 100 is not limited to 1 and may be 2 or more.

The processing apparatus 200 is a desktop PC, a laptop PC, or the like. PC is an abbreviation for Personal Computer. The processing apparatus 200 performs image processing of generating the recording data DP and processing of controlling printing by the ink jet printer 100. In the image processing, the processing apparatus 200 generates the recording data DP by performing various types of processing such as color conversion and RIP processing on the image data in the file format such as PostScript, PDF, or XPS. RIP is an abbreviation for Raster Image Processor.

The processing apparatus 200 is communicably connected to the server 300 via a LAN, a WAN, and a network NW such as the Internet. LAN is an abbreviation for Local Area Network. WAN is an abbreviation for Wide Area Network.

The server 300 is a computer that functions as cloud servers CS described below. The server 300 is managed by, for example, a business operator different from the head manufacturer, the printer manufacturer, and the end user. The business operator that manages the server 300 may be hereinafter referred to as a "server business operator". The head manufacturer uses a part of the server 300.

1-2. Configuration of Server 300

Figure 2:
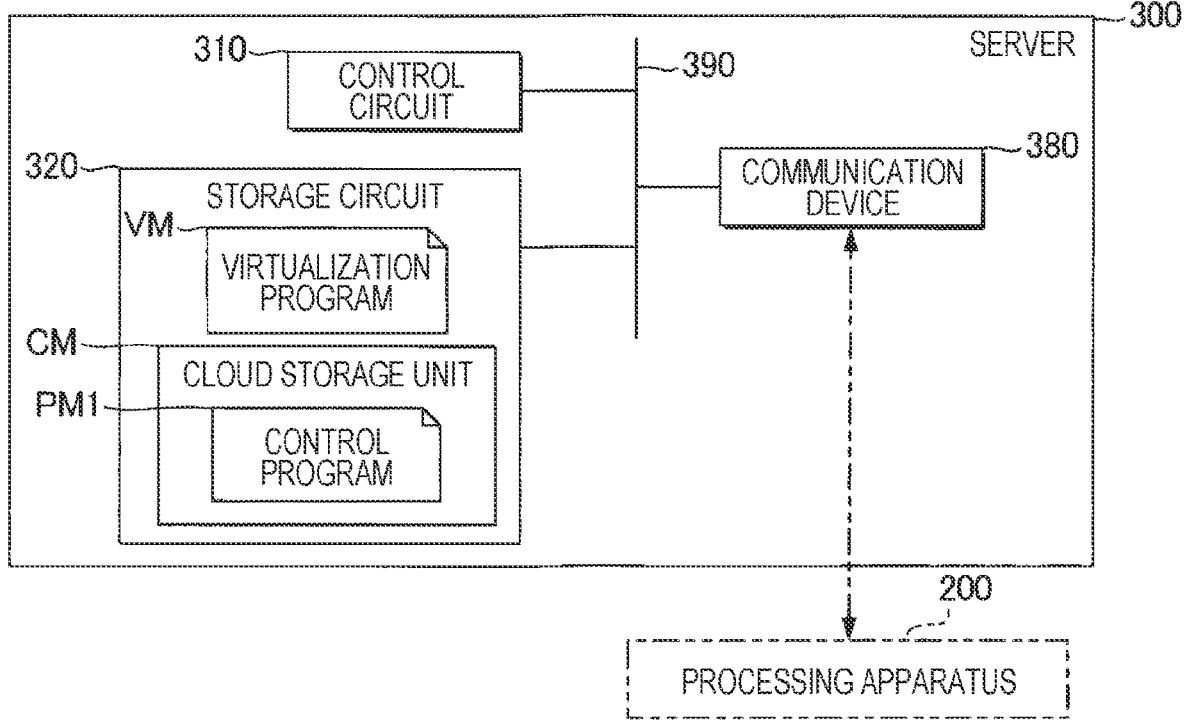
FIG. 2 is a diagram illustrating an example of a configuration of a server.

FIG. 2 is a diagram illustrating an example of a configuration of the server 300. The server 300 includes a control circuit 310, a storage circuit 320, and a communication device 380. The control circuit 310, the storage circuit 320, and the communication device 380 are connected to each other via a bus 390 for communicating information.

The control circuit 310 includes a processor such as one or more CPUs, for example. CPU is an abbreviation for Central Processing Unit. The control circuit 310 may include a programmable logic device such as an FPGA instead of or in addition to the one or more CPUs. FPGA is an abbreviation for Field Programmable Gate Array.

The storage circuit 320 includes a magnetic storage device, a flash ROM, or the like. The storage circuit 320 stores a plurality of programs including a virtualization program VM that is readable by the control circuit 310 and is executed by the control circuit 310, various types of information that is used by the control circuit 310, and the like. The virtualization program VM divides a resource including the control circuit 310 and the storage circuit 320 of the server 300 into a plurality of resources and causes the divided resources to operate as the respective cloud servers CS described below. The head manufacturer uses at least one of the plurality of cloud servers CS as the part of the server 300. In the present embodiment, as illustrated in FIG. 2, a storage region included in the storage circuit 320 and allocated to the cloud server CS used by the head manufacturer is referred to as a cloud storage unit CM. In the cloud storage unit CM, a control program PM1 is stored. The control program PM1 is developed by the head manufacturer.

However, the storage circuit 320 may not store the virtualization program VM, and the processing apparatus 200 may access the server 300 instead of the cloud servers CS.

For example, the storage circuit 320 includes one or a plurality of semiconductor memories. For example, the storage circuit 320 includes one or a plurality of volatile memories, such as one or a plurality of RAMs, or one or a plurality of nonvolatile memories, such as one or a plurality of ROMs, EEPROMs, or PROMs. Alternatively, for example, the storage circuit 320 includes one or a plurality of volatile memories, such as one or a plurality of RAMs, and one or a plurality of nonvolatile memories, such as one or a plurality of ROMs, EEPROMs, or PROMs. RAM is an abbreviation for Random-Access Memory. ROM is an abbreviation for Read-Only Memory. EEPROM is an abbreviation for Electrically Erasable Programmable Read-Only Memory. PROM is an abbreviation for Programmable Read-Only Memory.

The communication device 380 is hardware including a communication circuit for communicating with the processing apparatus 200 via the network NW. The communication device 380 is also referred to as a network device, a network controller, a network card, or a communication module, for example.

1-3. Configuration of Processing Apparatus 200

Figure 3:
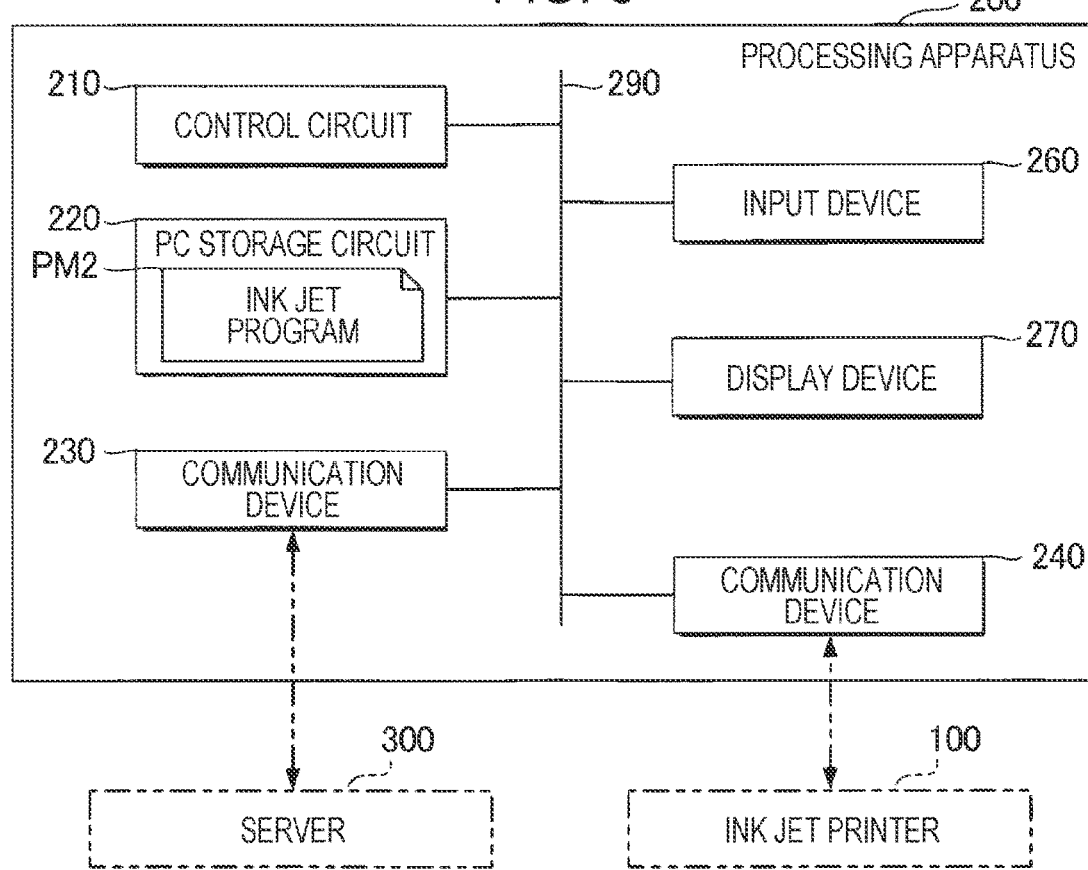
FIG. 3 is a diagram illustrating a configuration of a processing apparatus.

FIG. 3 is a diagram illustrating a configuration of the processing apparatus 200. The processing apparatus 200 includes a control circuit 210, a PC storage circuit 220, a communication device 230, an input device 260, a display device 270, and a communication device 240. The control circuit 210, the PC storage circuit 220, the communication device 230, the input device 260, the display device 270, and the communication device 240 are connected to each other via a bus 290 for communicating information.

The control circuit 210 includes a processor such as one or more CPUs. The control circuit 210 may include a programmable logic device such as an FPGA instead of or in addition to the one or more CPUs.

The PC storage circuit 220 includes a magnetic storage device, a flash ROM, or the like. The PC storage circuit 220 stores a plurality of programs including an ink jet program PM2 that is readable by the control circuit 210 and is executed by the control circuit 210, various types of information that is used by the control circuit 210, and the like. For example, the PC storage circuit 220 includes one or a plurality of semiconductor memories. For example, the PC storage circuit 220 includes one or a plurality of volatile memories, such as one or a plurality of RAMs, or one or a plurality of nonvolatile memories, such as one or a plurality of ROMs, EEPROMs, or PROMs. Alternatively, for example, the PC storage circuit 220 includes one or a plurality of volatile memories, such as one or a plurality of RAMs, and one or a plurality of nonvolatile memories such as one or a plurality of ROMs, EEPROMs, or PROMs. The ink jet program PM2 is downloaded from a cloud server CS operating on the server 300 among the plurality of cloud servers CS and is installed in the processing apparatus 200, for example, when the processing apparatus 200 is connected to the ink jet printer 100.

The communication device 230 is hardware including a communication circuit for communicating with the server 300 via the network NW. The communication device 230 is also referred to as a network device, a network controller, a network card, or a communication module, for example.

The communication device 240 is a circuit that can communicate with the ink jet printer 100. For example, the communication device 240 is a USB network card, a Bluetooth network card, or the like. USB is an abbreviation for Universal Serial Bus. USB and Bluetooth are registered trademarks. Generally, a transmission speed between the processing apparatus 200 and the server 300 is lower than a transmission speed between the processing apparatus 200 and the ink jet printer 100.

The input device 260 outputs operation information according to an operation of the user U. The input device 260 is a mouse and a keyboard, for example.

The display device 270 displays an image indicating some information to the user U. The display device 270 is an organic EL display, an LED display, or an LCD. EL is an abbreviation for Electro-Luminescence. LED is an abbreviation for Light Emitting Diode. LCD is an abbreviation for Liquid Crystal Display. The input device 260 and the display device 270 may be integrally formed. A device in which the input device 260 and the display device 270 are integrally formed is, for example, a touch panel.

As illustrated in FIGS. 1 to 3, a business model is present in which the head manufacturer provides the head unit HU to the printer manufacturer, and the printer manufacturer manufactures the ink jet printer 100 by incorporating the head unit HU in the printer body. In this business model, the printer manufacturer generally designs and manufactures the components other than the head unit HU. In the present embodiment, the head manufacturer prepares the cloud server CS and the ink jet program PM that is executed in the processing apparatus 200, and the user U connects the processing apparatus 200 to the cloud server CS and causes the processing apparatus 200 to execute the ink jet program PM2. Therefore, in the present embodiment, it is possible to reduce the burden of the printer manufacturer for design and manufacturing since the printer manufacturer does not need to prepare the ink jet program PM2.

1-4. Configuration of Ink Jet Printer 100

Figure 4:
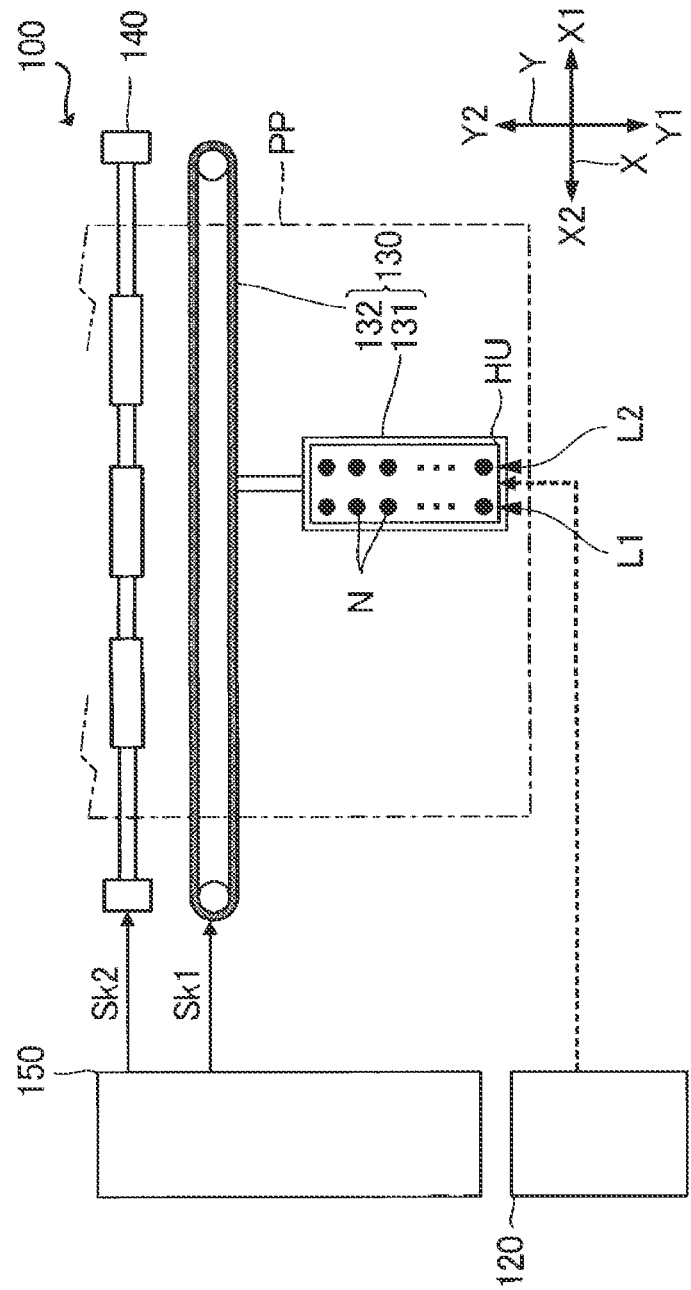
FIG. 4 is a schematic diagram illustrating an example of a configuration of an ink jet printer.
Figure 5:
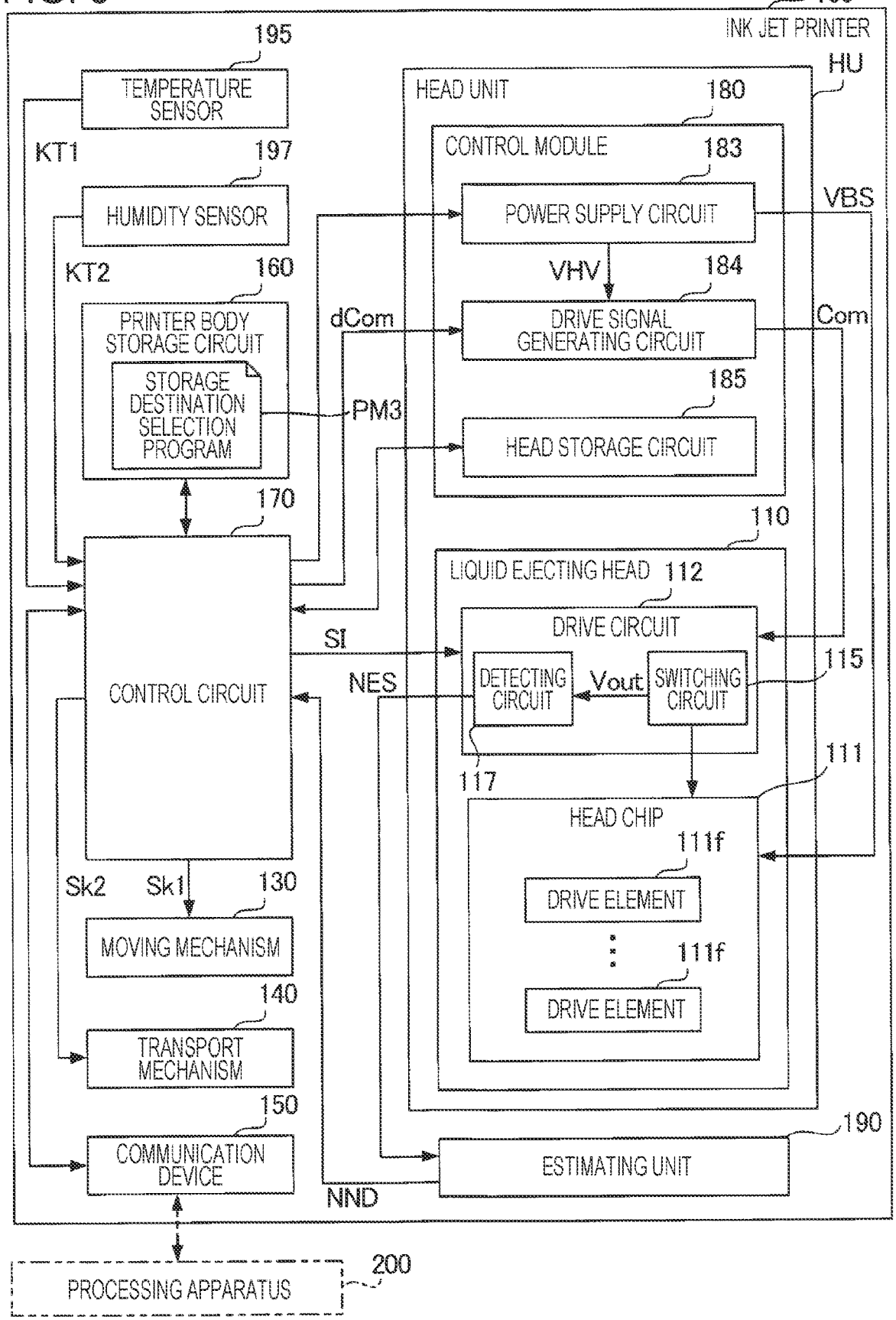
FIG. 5 is a block diagram illustrating the example of the configuration of the ink jet printer.

FIG. 4 is a schematic diagram illustrating an example of a configuration of the ink jet printer 100. FIG. 5 is a block diagram illustrating the example of the configuration of the ink jet printer 100. In the following description, it is assumed that an X axis, a Y axis, and a Z axis are perpendicular to each other. A direction along the X axis as viewed from any point is referred to as an X1 direction, and a direction opposite to the X1 direction is referred to as an X2 direction. Similarly, directions that extend along the Y axis and are opposite to each other as viewed from any point are referred to as a Y1 direction and a Y2 direction, and directions that extend along the Z axis and are opposite to each other as viewed from any point are referred to as a Z1 direction and a Z2 direction. An X-Y plane including the X axis and the Y axis corresponds to a horizontal plane. The Z axis is an axis line extending in a vertical direction, and the Z2 direction corresponds to a downward direction in the vertical direction.

The ink jet printer 100 according to the first embodiment is a serial printer that forms an image on the recording medium PP by a multipath method. In the multipath method, an image is formed on the recording medium PP by performing scanning a plurality of times. Specifically, as illustrated in FIG. 4, the ink jet printer 100 according to the first embodiment performs a recording operation of forming an image on the recording medium PP by ejecting the ink from the nozzles N while transporting the recording medium PP in the Y1 direction as an auxiliary scan direction and moving the head unit HU in the X1 and X2 directions as a main scan direction. The recording medium PP is not limited as long as the ink jet printer 100 can perform printing on the recording medium PP. Examples of the recording medium PP are various types of paper, various types of cloth, various films, and the like. FIG. 4 representatively illustrates nozzles N among the plurality of nozzles N included in the head unit HU.

As illustrated in FIGS. 4 and 5, the ink jet printer 100 includes the head unit HU, a liquid container 120, a moving mechanism 130, a transport mechanism 140, a communication device 150, a printer body storage circuit 160, a control circuit 170, an estimating unit 190, a temperature sensor 195, and a humidity sensor 197.

The head unit HU is an assembly including a head chip 111, a drive circuit 112, a power supply circuit 183, a drive signal generating circuit 184, and a head storage circuit 185.

In the example illustrated in FIG. 4, the head unit HU is sectioned into a liquid ejecting head 110 and a control module 180. The liquid ejecting head 110 includes the head chip 111 and the drive circuit 112. The control module 180 includes the power supply circuit 183, the drive signal generating circuit 184, and the head storage circuit 185. The head unit HU may not be sectioned into the liquid ejecting head 110 and the control module 180. For example, a part of the control module 180 or the entire control module 180 may be incorporated in the liquid ejecting head 110.

The head chip 111 ejects the ink toward the recording medium PP. FIG. 5 representatively illustrates a plurality of drive elements 111f among constituent elements of the head chip 111. A detailed example of the head chip 111 is described below with reference to FIG. 6.

In the example illustrated in FIG. 5, the number of head chips 111 included in the head unit HU is 1, but may be 2 or more. One or more head chips 111 are arranged such that the plurality of nozzles N are distributed over a part of the recording medium PP in a width direction of the recording medium PP.

The drive circuit 112 includes a switching circuit 115 and a detecting circuit 117. The switching circuit 115 switches, under control by the control circuit 170, whether to supply a drive signal Com output from the drive signal generating circuit 184 to each of the plurality of drive elements 111f included in the head chip 111. In addition, the switching circuit 115 switches whether to electrically couple the plurality of drive elements 111f to the detecting circuit 117. The switching circuit 115 includes a switch group including a transmission gate for the switching and the like. The detecting circuit 117 outputs, to the estimating unit 190, a residual vibration signal NES indicating vibrations remaining in pressure chambers CV corresponding to the drive elements 111f after the drive elements 111f are driven. The pressure chambers CV are described below with reference to FIG. 6. The vibrations remaining in the pressure chambers CV are hereinafter referred to as "residual vibrations".

The power supply circuit 183 receives supply of power from a commercial power supply (not illustrated) to generate various predetermined electrical potentials. The generated various electrical potentials are appropriately supplied to the components of the ink jet printer 100. In the example illustrated in FIG. 5, the power supply circuit 183 generates a power supply potential VHV and an offset potential VBS. The offset potential VBS is supplied to the head chip 111 and the like. In addition, the power supply potential VHV is supplied to the drive signal generating circuit 184 and the like.

The drive signal generating circuit 184 generates the drive signal Com for driving each of the drive elements 111f included in the head chip 111. Specifically, the drive signal generating circuit 184 includes a DA conversion circuit and an amplifying circuit, for example. In the drive signal generating circuit 184, the DA conversion circuit converts a waveform specifying signal dCom from the control circuit 170 from a digital signal to an analog signal, and the amplifying circuit uses the power supply potential VHV from the power supply circuit 183 to amplify the analog signal so as to generate the drive signal Com. The waveform specifying signal dCom is described below.

The head storage circuit 185 includes a nonvolatile memory such as a flash ROM. The head storage circuit 185 stores information regarding the head unit HU, for example. The information regarding the head unit HU is, for example, a serial number of the head unit HU. The head storage circuit 185 includes a storage region in which data other than the information regarding the head unit HU can be stored.

In the present embodiment, the head unit HU may be detached from the ink jet printer 100. Therefore, the head storage circuit 185 is a nonvolatile memory to prevent data from being deleted even when power is not supplied from the power supply circuit 183. However, the ink jet printer 100 is not limited thereto. For example, the head unit HU may include a battery such as a button cell battery, and the head storage circuit 185 may be a volatile memory that receives supply of power from the battery.

As illustrated in FIG. 4, in the ink jet printer 100, the liquid container 120 for storing the ink is disposed. For example, a cartridge attachable to and detachable from the ink jet printer 100, a bag-shaped ink pack formed of a flexible film, or an ink tank that can be filled with the ink is used as the liquid container 120.

The moving mechanism 130 and the transport mechanism 140 change relative positions of the recording medium PP and the head unit HU to each other under control by the control circuit 170. Changing the relative positions may move the head unit HU while the position of the recording medium PP is fixed, or may move the recording medium PP while the position of the head unit HU is fixed. In the present embodiment, the head unit HU is moved in the direction along the X axis that is the main scan direction while the position of the recording medium PP in the direction along the X axis is fixed, and the recording medium PP is moved in the Y1 direction that is the auxiliary scan direction while the position of the head unit HU in the direction along the Y axis is fixed.

The moving mechanism 130 causes the head unit HU to reciprocate along the X axis under control by the control circuit 170. As illustrated in FIG. 4, the moving mechanism 130 includes a substantially box-shaped carriage 131 housing the head unit HU, and an endless belt 132 to which the head unit HU is fixed. The liquid container 120 may be installed in the carriage 131 together with the head unit HU.

The transport mechanism 140 transports the recording medium PP in the Y1 direction under control by the control circuit 170. Specifically, the transport mechanism 140 includes a transport roller (not illustrated) whose rotation axis is parallel to the X axis, and a motor (not illustrated) that rotates the transport roller under control by the control circuit 170.

The communication device 150 is a circuit that can communicate with the processing apparatus 200. For example, the communication device 150 is a USB network card, a Bluetooth network card, or the like. The communication device 150 may be integrated with the control circuit 170.

In the present embodiment, the communication device 150 can communicate with the processing apparatus 200. However, when the head unit HU includes a communication device, this communication device may communicate with the processing apparatus 200. In the present embodiment, the ink jet printer 100 is connectable to the processing apparatus 200, but the ink jet printer 100 may be connectable to the server 300. When the ink jet printer 100 is connectable to the server 300, the communication device 150 is connected to the server 300. However, the present embodiment is not limited thereto. For example, when the head unit HU includes a communication device, this communication device may communicate with the server 300.

The printer body storage circuit 160 stores various programs that are executed by the control circuit 170, various data such as the recording job JB that is processed by the control circuit 170, and a storage destination selection program PM3 according to the present embodiment. For example, the printer body storage circuit 160 includes one or a plurality of semiconductor memories. For example, the printer body storage circuit 160 includes one or a plurality of volatile memories, such as one or a plurality of RAMs, or one or a plurality of nonvolatile memories, such as one or a plurality of ROMs, EEPROMs, or PROMs. Alternatively, the printer body storage circuit 160 includes one or a plurality of volatile memories, such as one or a plurality of RAMs, and one or a plurality of nonvolatile memories, such as one or a plurality of ROMs, EEPROMs, or PROMs. The printer body storage circuit 160 may be configured as a part of the control circuit 170. The storage destination selection program PM3 is developed by the head manufacturer. For example, when the processing apparatus 200 is connected to the ink jet printer 100, the storage destination selection program PM3 is downloaded into the ink jet printer 100 from a cloud server CS operating on the server 300 among the plurality of cloud servers CS via the processing apparatus 200. Alternatively, the head manufacturer may provide a source code of the storage destination selection program PM3 to the printer manufacturer, and the printer manufacturer may use a PC or the like to generate the storage destination selection program PM3 by cross-compiling the source code with a setting for executing the storage destination selection program PM3 in the control circuit 170.

The control circuit 170 has a function of controlling operations of the components of the ink jet printer 100 and a function of processing various data. The control circuit 170 includes a processor such as one or more CPUs, for example. The control circuit 170 may include a programmable logic device such as an FPGA instead of or in addition to the one or more CPUs.

The control circuit 170 executes a program stored in the printer body storage circuit 160 to control operations of the components of the ink jet printer 100. In this case, the control circuit 170 generates signals such as a control signal Sk1, a control signal Sk2, a print signal S1, and a waveform specifying signal dCom as signals for controlling the operations of the components of the ink jet printer 100.

The control signal Sk1 is a signal for controlling driving of the moving mechanism 130. The control signal Sk2 is a signal for controlling driving of the transport mechanism 140. The print signal S1 is a signal for controlling driving of the drive circuit 112. Specifically, the print signal S1 specifies whether the drive circuit 112 supplies the drive signal Com from the drive signal generating circuit 184 to the drive elements 111$f$ in each predetermined unit time period. By performing the specifying, an amount of the ink to be ejected from the head chip 111 and the like are specified. The waveform specifying signal dCom is a digital signal for defining a waveform of the drive signal Com to be generated by the drive signal generating circuit 184.

To perform the recording operation, first, the control circuit 170 stores the recording job JB supplied from the processing apparatus 200 to the printer body storage circuit 160. Next, the control circuit 170 generates various control signals such as the print signal S1, the waveform specifying signal dCom, the control signal Sk1, and the control signal Sk2 based on various data such as the recording data DP included in the recording job JB stored in the printer body storage circuit 160. Then, the control circuit 170 controls the head unit HU so as to drive the drive elements 111$f$ based on the various control signals and the various data stored in the printer body storage circuit 160 while controlling the transport mechanism 140 and the moving mechanism 130 to change the relative position of the recording medium PP to the head unit HU. Therefore, the control circuit 170 controls whether to eject the ink from the drive elements 111$f$, an amount of the ink to be ejected, the timing of ejecting the ink, and the like and controls the execution of the recording operation of forming the image based on the recording data DP on the recording medium PP.

Upon accepting a viscosity estimation instruction from the processing apparatus 200, the ink jet printer 100 according to the present embodiment performs viscosity estimation processing of estimating the viscosity of the ink in the pressure chambers CV corresponding to the drive elements 111$f$ in order to determine whether an ink ejection state of each of the drive elements 111$f$ is normal, that is, whether the ejection of the ink from the nozzles N included in each of the drive elements 111$f$ is normal or abnormal. The abnormal ejection is a state in which even when the drive elements 111$f$ are driven by the drive signal Com in order to eject the ink from the drive elements 111$f$, the ink cannot be ejected due to a mode defined by the drive signal Com. The abnormal ejection may occur due to an increase in the viscosity of the ink. The increase in the viscosity of the ink progresses due to evaporation of an ink solvent from interfaces of the nozzles N, typically, due to evaporation of water or the like.

In the viscosity estimation processing, the ink jet printer 100 performs a series of processes. In the series of processes, first, the ink jet printer 100 causes the control circuit 170 to drive a drive element 111$f$ among the plurality of drive elements 111$f$ so as to cause a residual vibration in the drive element 111$f$. Second, the ink jet printer 100 causes the detecting circuit 117 to generate a residual vibration signal NES based on a detection signal Vout detected from the drive element 111$f$ in which the residual vibration occurred. Third, the ink jet printer 100 causes the estimating unit 190 to estimate the viscosity based on the residual vibration signal NES and generate viscosity information NND indicating the estimated viscosity. The viscosity information NND is an example of "data based on a residual vibration".

The temperature sensor 195 measures a temperature of the ink jet printer 100, generates temperature information KT1 indicating a result of measuring the temperature, and outputs the temperature information KT1 to the control circuit 210. The humidity sensor 197 measures a humidity of the ink jet printer 100, generates humidity information KT2 indicating a result of measuring the humidity, and outputs the humidity information KT2 to the control circuit 210.

In the present embodiment, it is assumed that the temperature sensor 195 and the humidity sensor 197 are mounted on an electronic circuit on a substrate included in the ink jet printer 100 and detect the temperature and humidity of the ink jet printer 100, respectively. The present disclosure is not limited thereto. For example, either one or both of the temperature sensor 195 and the humidity sensor 197 may be disposed in the head unit HU.

Figure 6:
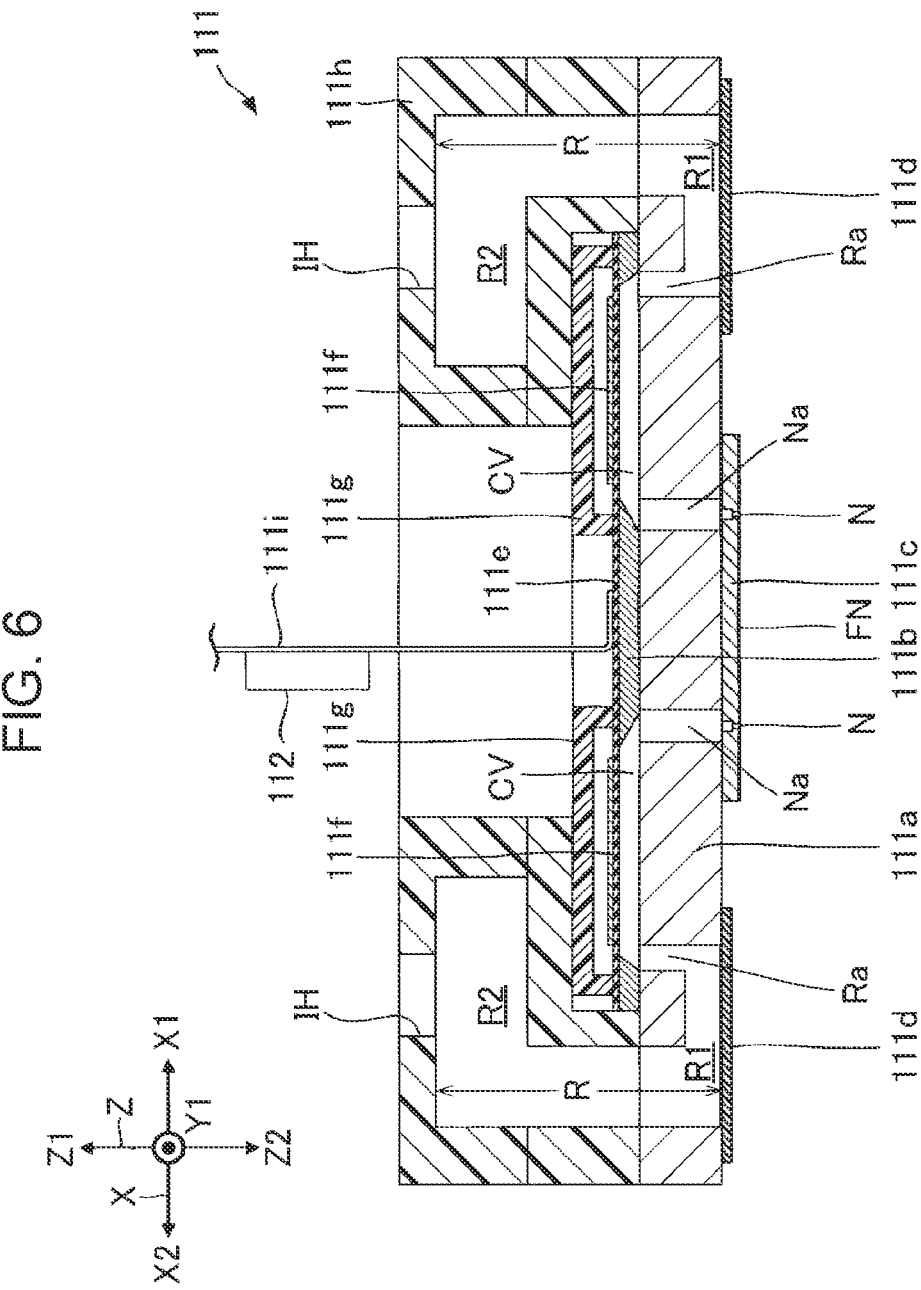
FIG. 6 is a cross-sectional view illustrating an example of a configuration of a head chip.

FIG. 6 is a cross-sectional view illustrating an example of a configuration of the head chip 111. As illustrated in FIGS. 4 and 6, the head chip 111 includes the plurality of nozzles N arrayed in the direction along the Y axis. The plurality of nozzles N are sectioned into a first row L1 and a second row L2 that are spaced apart from each other in the direction along the X axis. Each of the first row L1 and the second row L2 is a set of a plurality of nozzles N linearly arrayed in the direction along the Y axis.

The head chip 111 has a configuration substantially symmetrical about the direction along the X axis. However, the positions of the plurality of nozzles N of the first row L1 may match the positions of the plurality of nozzles N of the second row L2 in the direction along the Y axis or may be different from the positions of the plurality of nozzles N of the second row L2 in the direction along the Y axis. FIG. 6 illustrates a configuration in which the positions of the plurality of nozzles N of the first row L1 match the positions of the plurality of nozzles N of the second row L2 in the direction along the Y axis.

As illustrated in FIG. 6, the head chip 111 includes a flow path substrate 111a, a pressure chamber substrate 111b, a nozzle plate 111c, a vibration absorber 111d, a vibration plate 111e, the plurality of drive elements 111f, a protective plate 111g, a casing 111h, and a wiring substrate 111i.

The flow path substrate 111a and the pressure chamber substrate 111b are stacked in the Z1 direction in this order and form a flow path for supplying the ink to the plurality of nozzles N. The vibration plate 111e, the plurality of drive elements 111f, the protective plate 111g, the casing 111h, and the wiring substrate 111i are disposed in a region located in the Z1 direction with respect to a stacked body of the flow path substrate 111a and the pressure chamber substrate 111b. Meanwhile, the nozzle plate 111c and the vibration absorber 111d are disposed in a region located in the Z2 direction with respect to the stacked body. The members 111a to 111i of the head chip 111 are substantially plate-shaped members substantially elongated in the Y direction and are bonded to each other by, for example, an adhesive. The members 111a to 111i of the head chip 111 are described below.

The nozzle plate 111c is a plate-shaped member in which the plurality of nozzles N of each of the first row L1 and the second row L2 are disposed. Each of the plurality of nozzles N is a through-hole through which the ink passes. A surface of the nozzle plate 111c facing toward the Z2 direction is a nozzle surface FN. The nozzle plate 111c is formed, for example, by processing a silicon single-crystal substrate by a semiconductor manufacturing technique using a processing technique such as dry etching or wet etching. However, in the formation of the nozzle plate 111c, another known method and another known material may be appropriately used. In addition, a cross-sectional shape of each of the nozzles N is typically a circular shape, but is not limited thereto and may be a non-circular shape such as a polygonal shape or an elliptical shape.

In the flow path substrate 111a, a space R1, a plurality of supply flow paths Ra, and a plurality of communication flow paths Na are disposed for each of the first row L1 and the second row L2. The spaces R1 are openings elongated in the direction along the Y axis as viewed in a plan view in the direction along the Z axis. Each of the supply flow paths Ra and each of the communication flow paths Na are through-holes formed for a respective one of the nozzles N. The supply flow paths Ra communicate with the spaces R1.

The pressure chamber substrate 111b is a plate-shaped member in which the plurality of pressure chambers CV that are referred to as cavities are disposed for each of the first row L1 and the second row L2. The plurality of pressure chambers CV are arrayed in the direction along the Y axis. Each of the pressure chambers CV is formed for a respective one of the nozzles N. The pressure chambers CV are spaces elongated in the direction along the X axis in a plan view. Each of the flow path substrate 111a and the pressure chamber substrate 111b is formed, for example, by processing a silicon single-crystal substrate by a semiconductor manufacturing technique in a similar manner to the formation of the nozzle plate 111c described above. However, in the formation of the flow path substrate 111a and the pressure chamber substrate 111b, another known method and another known material may be appropriately used.

The pressure chambers CV are spaces located between the flow path substrate 111a and the vibration plate 111e. The plurality of pressure chambers CV are arrayed in the direction along the Y axis for each of the first row L1 and the second row L2. In addition, the pressure chambers CV communicate with the respective communication flow paths Na and the respective supply flow paths Ra. Therefore, the pressure chambers CV communicate with the nozzles N via the communication flow paths Na and communicate with the spaces R1 via the supply flow paths Ra.

The vibration plate 111e is disposed on a surface of the pressure chamber substrate 111b facing toward the Z1 direction. The vibration plate 111e is a plate-shaped member that can elastically vibrate. The vibration plate 111e includes a first layer and a second layer that are stacked in the Z1 direction in this order, for example. The first layer is an elastic film made of silicon oxide ($SiO_2$), for example. The elastic film is formed by, for example, thermally oxidizing one surface of a silicon single-crystal substrate. The second layer is an insulating film made of zirconium oxide ($ZrO_2$), for example. The insulating film is formed by forming a layer of zirconium by sputtering and thermally oxidizing the layer, for example. The vibration plate 111e is not limited to the configuration with the stacked first and second layers described above and may be a single layer or may include three or more layers.

The plurality of drive elements 111f corresponding to the nozzles N in each of the first row L1 and the second row L2 are disposed on a surface of the vibration plate 111e facing toward the Z1 direction. Each of the drive elements 111f is a passive element that is deformed by supply of the drive signal Com. The drive elements 111f are elongated in the direction along the X axis in a plan view. The plurality of drive elements 111f are arrayed in the direction along the Y axis such that the plurality of drive elements 111f correspond to the plurality of pressure chambers CV. The drive elements 111f overlap the pressure chambers CV in a plan view.

Each of the drive elements 111f is a piezoelectric element and includes a first electrode, a piezoelectric layer, and a second electrode that are stacked in the Z1 direction in this order, although not illustrated. The first electrodes or the second electrodes are individual electrodes spaced apart from each other for each of the drive elements 111$f$, and the drive signal Com is supplied to the individual electrodes. The other electrodes that are not the individual electrodes and are the first electrodes or the second electrodes are a strip-shaped common electrode extending in the direction along the Y axis and continuous over the plurality of drive elements 111$f$. The offset potential VBS is supplied to the other electrodes. Examples of a metal material of the electrodes are platinum (Pt), aluminum (Al), nickel (Ni), gold (Au), and copper (Cu). Among these materials, one type can be used alone or two or more types can be used in combination in the form of an alloy, a stacked layer, or the like. The piezoelectric layers are made of a piezoelectric material such as lead zirconate titanate (Pb(Zr, Ti)O$_3$). For example, the piezoelectric layers are a strip-shaped layer extending in the direction along the Y axis and continuous over the plurality of drive elements 111$f$. However, the piezoelectric layers may be integrated over the plurality of drive elements 111$f$. In this case, through-holes penetrating through the piezoelectric layers extend in the direction along the X axis in regions corresponding to gaps between the pressure chambers CV adjacent to each other in a plan view. When the vibration plate 111$e$ vibrates in coordination with the deformation of the drive elements 111$f$, pressure in the pressure chambers CV changes and the ink is ejected from the nozzles N.

In addition, in the viscosity estimation processing, the drive signal Com is supplied to the individual electrodes of the drive elements 111$f$ so as to drive the drive elements 111$f$. Each of the individual electrodes of the drive elements 111$f$ has an electrical potential that is changed by a residual vibration that occurred in the pressure chamber CV corresponding to the drive element 111$f$. In other words, each of the individual electrodes of the drive elements 111$f$ has an electrical potential corresponding to electromotive force of the drive element 111$f$ caused by a residual vibration that occurred in the pressure chamber CV corresponding to the drive element 111$f$. After the drive elements 111$f$ are driven, the switching circuit 115 electrically couples the individual electrodes of the drive elements 111$f$ to the detecting circuit 117 so as to supply the detection signal Vout to the detecting circuit 117.

The protective plate 111$g$ is a plate-shaped member disposed on the surface of the vibration plate 111$e$ facing toward the Z1 direction. The protective plate 111$g$ protects the plurality of drive elements 111$f$ and reinforces the mechanical strength of the vibration plate 111$e$. The plurality of drive elements 111$f$ are housed between the protective plate 111$g$ and the vibration plate 111$e$. The protective plate 111$g$ is made of a resin material, for example.

The casing 111$h$ is a member for storing the ink to be supplied to the plurality of pressure chambers CV. The casing 111$h$ is made of a resin material, for example. In the casing 111$h$, a space R2 is provided for each of the first row L1 and the second row L2. The spaces R2 are spaces communicating with the spaces R1 described above and function as reservoirs R for storing the ink to be supplied to the plurality of pressure chambers CV together with the spaces R1. In the casing 111$h$, an introduction inlet IH for supplying the ink to each of the reservoirs R is disposed. The ink in each of the reservoirs R is supplied to the pressure chambers CV through each of the supply flow paths Ra.

The vibration absorber 111$d$ is also referred to as a compliance substrate and is a flexible resin film forming wall surfaces of the reservoirs R. The vibration absorber 111$d$ reduces a change in the pressure of the ink in each of the reservoirs R. The vibration absorber 111$d$ may be a flexible thin metal plate. A surface of the vibration absorber 111$d$ facing toward the Z1 direction is bonded to the flow path substrate 111$a$ by an adhesive or the like.

The wiring substrate 111$i$ is mounted on the surface of the vibration plate 111$e$ facing toward the Z1 direction. The wiring substrate 111$i$ is a mounting component for electrically coupling the head chip 111 to the drive circuit 112, the control module 180, and the like. The wiring substrate 111$i$ is a flexible wiring substrate such as a COF, an FPC, or an FFC. The drive circuit 112 described above is mounted on the wiring substrate 111$i$ according to the present embodiment. COF is an abbreviation for Chip On Film. FPC is an abbreviation for Flexible Printed Circuit. FFC is an abbreviation for Flexible Flat Cable.

The head chip 111 is not limited to the form illustrated in FIG. 6. For example, a plurality of pressure chambers CV may communicate with each of nozzles N such that an amount of the ink to be ejected from each of the nozzles N is increased. In addition, in the configuration in which the positions of the plurality of nozzles N of the first row L1 match the positions of the plurality of nozzles N of the second row L2 in the direction along the Y axis as illustrated in FIG. 6, even when the ejection of the ink from one of two nozzles N of which the positions in the direction along the Y axis match is abnormal, the ink can be ejected from the other nozzle N onto a position onto which the ink needs to be ejected from the one nozzle N, and thus it is possible to reduce degradation of the quality of an image formed on the recording medium PP. Meanwhile, in a configuration in which the positions of the plurality of nozzles N of the first row L1 are different from the positions of the plurality of nozzles N of the second row L2 in the direction along the Y axis, a resolution in the direction along the Y axis can be higher, as compared with the configuration in which the positions of the plurality of nozzles N of the first row L1 match the positions of the plurality of nozzles N of the second row L2 in the direction along the Y axis.

Return to FIG. 5. The detecting circuit 117 generates the residual vibration signal NES based on the detection signal Vout as described above. The residual vibration signal NES is a signal obtained by shaping the detection signal Vout into a waveform suitable for processing in the estimating unit 190 by increasing the amplitude of the detection signal Vout, removing a noise component from the detection signal Vout, and the like. The residual vibration signal NES is an analog signal.

For example, the detecting circuit 117 may include a negative feedback amplifier for amplifying the detection signal Vout, a low-pass filter for attenuating a high-frequency component of the detection signal Vout, and a voltage follower for changing impedance and outputting the residual vibration signal NES with low impedance.

The estimating unit 190 generates viscosity information NND based on the residual vibration signal NES. For example, the estimating unit 190 generates amplitude information indicating the amplitudes of the residual vibrations based on the residual vibration signal NES, estimates the viscosity of the ink present in the pressure chambers CV based on the amplitude information, and generates the viscosity information NND indicating the estimated viscosity of the ink.

1-5. Regarding Storage Destination of Data

The ink jet printer 100 acquires various data. An example of the various data is one or more of the temperature information KT1 indicating the result of the measurement by the temperature sensor 195, the humidity information KT2 indicating the result of the measurement by the humidity sensor 197, the viscosity information NND during the recording operation, and the number of times that the drive elements 111$f$ are driven. In the following description, the various data acquired by the ink jet printer 100 is collectively referred to as collected data CD. Any one of data pieces that are the temperature information KT1, the humidity information KT2, the viscosity information NND, and the number of times that the drive elements 111$f$ are driven is an example of "first data", and the other data pieces excluding the first data are an example of "second data".

The collected data CD is generally stored in a storage unit in the recording system 20. The storage unit in the recording system 20 is the PC storage circuit 220, the printer body storage circuit 160, and the head storage circuit 185. In the following description, the storage unit in the recording system 20 is referred to as a "recording system internal storage unit KM". In addition, the head unit HU, the printer body, and the processing apparatus 200 in the recording system 20 may be collectively referred to as "recording system internal devices".

There was a problem that since only a recording system internal device storing collected data CD could use the collected data CD in a state in which the collected data CD was stored in the recording system internal storage unit KM as long as the collected data CD was not transferred, a recording system internal device not storing the collected data CD could not use the collected data CD. In a business model in which the head manufacturer provides the head unit HU to the printer manufacturer, the following three usage modes of the ink jet system 10 are conceivable, for example. The first usage mode is a mode in which a single head unit HU is switched and attached to one of a plurality of printer bodies. The second usage mode is a mode in which one of a plurality of head units HU is switched and attached to a single printer body. The third usage mode is a mode in which one of a plurality of ink jet printers 100 is switched and connected to a single processing apparatus 200.

When the ink jet system 10 is used in the first usage mode, for example, abnormal ejection occurs in any of the head units HU attached to the plurality of printer bodies, and a head unit HU that normally ejects ink is used for the plurality of printer bodies. When the ink jet system 10 is used in the second usage mode, and, for example, features of the plurality of head units HU are different, any one of the plurality of head units HU is switched according to a request from the user U. For example, when an amount of ink to be ejected is to be increased, the user U attaches, to a printer body, a head unit HU having a head chip 111 in which a plurality of pressure chambers CV communicate with a single nozzle N. Alternatively, when an image with a high resolution is to be formed on the recording medium PP, the user U attaches, to a printer body, a head unit HU having a head chip 111 in which positions of a plurality of nozzles N1 of a first row L1 are different from positions of a plurality of nozzles N of a second row L2 in the direction along the Y axis. When the ink jet system 10 is used in the third usage mode, and, for example, either one or both of the type of a recording medium PP used in an ink jet printer 100 among a plurality of ink jet printers 100 and the type of ink used in the ink jet printer 100 are different from one or both of the type of a recording medium PP used in another ink jet printer 100 among the plurality of ink jet printers 100 and the type of ink used in the other ink jet printer 100, an ink jet printer 100 that performs a recording operation according to a request from the user U is switched.

The three usage modes described above have in common that a plurality of recording system internal devices of any one type among the head units HU, the printer bodies, and the processing apparatuses 200 are switched. Selecting which of the plurality of usage modes depends on the user U. Therefore, there was a problem that when collected data CD was stored in a recording system internal device switched and used, the collected data CD could not be used after the switching of the recording system internal device. In addition, there was a problem that when collected data CD was stored in the recording system internal storage unit KM, the collected data CD could not be analyzed by the cloud servers CS and an available storage capacity of the recording system internal storage unit KM was insufficient.

Meanwhile, when collected data CD is stored in the cloud storage unit CM and the recording operation is to be performed, the collected data CD during the previous recording operation may be necessary for the execution of the recording operation, and the recording system 20 may inquire the cloud servers CS for the collected data CD. There was a problem that an inquiry to the cloud servers CS led to a reduction in the number of recording media usable for the recording operation per unit time period, that is, led to a reduction in the throughput. A case where the collected data CD during the previous recording operation is necessary is, for example, a case where when the current temperature information KT1 indicates an abnormal state such as a high temperature or a low temperature, or the current viscosity information NND indicates an abnormal state such as an increase in the viscosity, the temperature information KT1 or the viscosity information NND during the previous recording operation is read, and it is determined whether the read information KT1 or NND during the previous recording operation also indicates an abnormal state. When the read information KT1 or NND during the previous recording operation indicates an abnormal state, the recording system 20 determines that the current abnormal state is a state intended by the user U, and performs the recording operation. When the read information KT1 or NND during the previous recording operation does not indicate an abnormal state, the recording system 20 determines that the current abnormal state is a state not intended by the user U, and stops the recording operation. In addition, there was a problem that when the collected data CD was stored in the cloud storage unit CM, it was necessary to ensure security so as to prevent personal information and confidential information from leaking.

The extent to which the problems described above are solved varies depending on the user U and also varies depending on the type of the collected data CD. Therefore, the recording system 20 according to the present embodiment accepts selection information CI indicating a result of having the user U select any one or more of the recording system internal storage unit KM and the cloud storage unit CM to store the collected data CD. Storing the collected data CD in any one or more of the recording system internal storage unit KM and the cloud storage unit CM means that the collected data CD may be stored in only the recording system internal storage unit KM, the collected data CD may be stored in only the cloud storage unit CM, or the collected data CD may be stored in both of the recording system internal storage unit KM and the cloud storage unit CM.

1-6. Functions and Operations of Ink Jet System 10

Figure 7:
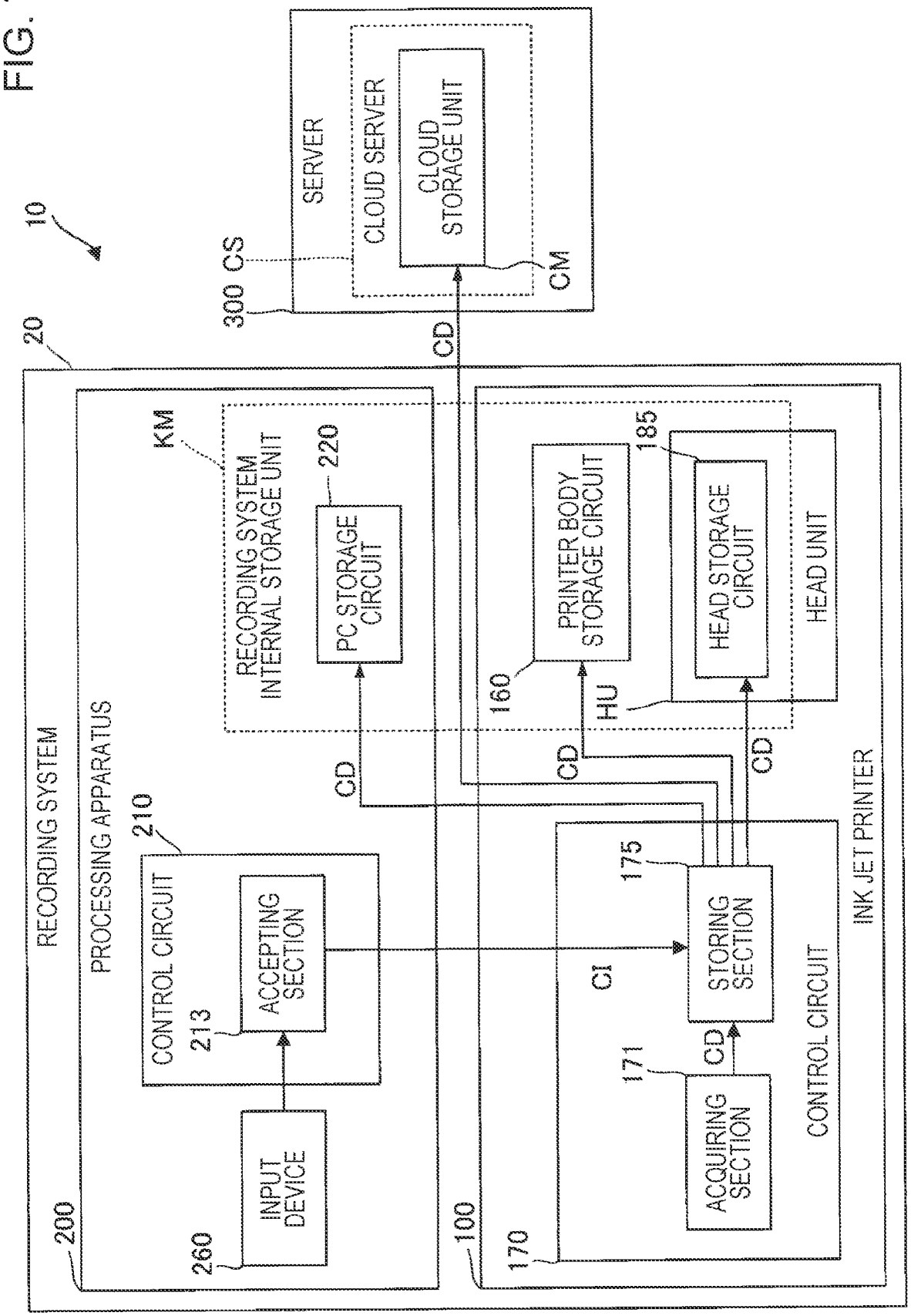
FIG. 7 is a diagram illustrating functions of the ink jet system.

FIG. 7 is a diagram illustrating functions of the ink jet system 10. As illustrated in FIG. 7, the control circuit 210 of the processing apparatus 200 reads the ink jet program PM2 from the PC storage circuit 220 and executes the read ink jet program PM2 so as to function as an accepting section 213. In addition, the control circuit 170 of the ink jet printer 100 reads the storage destination selection program PM3 and executes the read storage destination selection program PM3 so as to function as an acquiring section 171 and a storing section 175.

The control circuit 210 functions as the accepting section 213 and may function as the acquiring section 171 and the storing section 175. Alternatively, the ink jet printer 100 functions as the acquiring section 171 and the storing section 175 and may include an input device and a display device and may function as the accepting section 213.

As illustrated in FIG. 7, the recording system internal storage unit KM includes the head storage circuit 185, the printer body storage circuit 160, and the CP storage circuit 220. The recording system internal storage unit KM is an example of a "first storage unit". The cloud storage unit CM is an example of a "second storage unit". The head storage circuit 185 is an example of a "third storage unit". The printer body storage circuit 160 is an example of a "fourth storage unit". The PC storage circuit 220 is an example of a "fifth storage unit".

The ink jet system 10 performs a selection information acceptance process, a process when the collected data is acquired, and a process after the recording operation ends. The selection information acceptance process is a process of accepting the selection information CI. The process when the collected data is acquired is a process that is performed when the collected data CD is acquired after the start of the recording operation. The process after the recording operation ends is a process that is performed after the recording operation ends. In the present embodiment, unless otherwise specified, it is assumed that the process when the collected is acquired is performed after the selection information acceptance process is performed.

Figure 8:
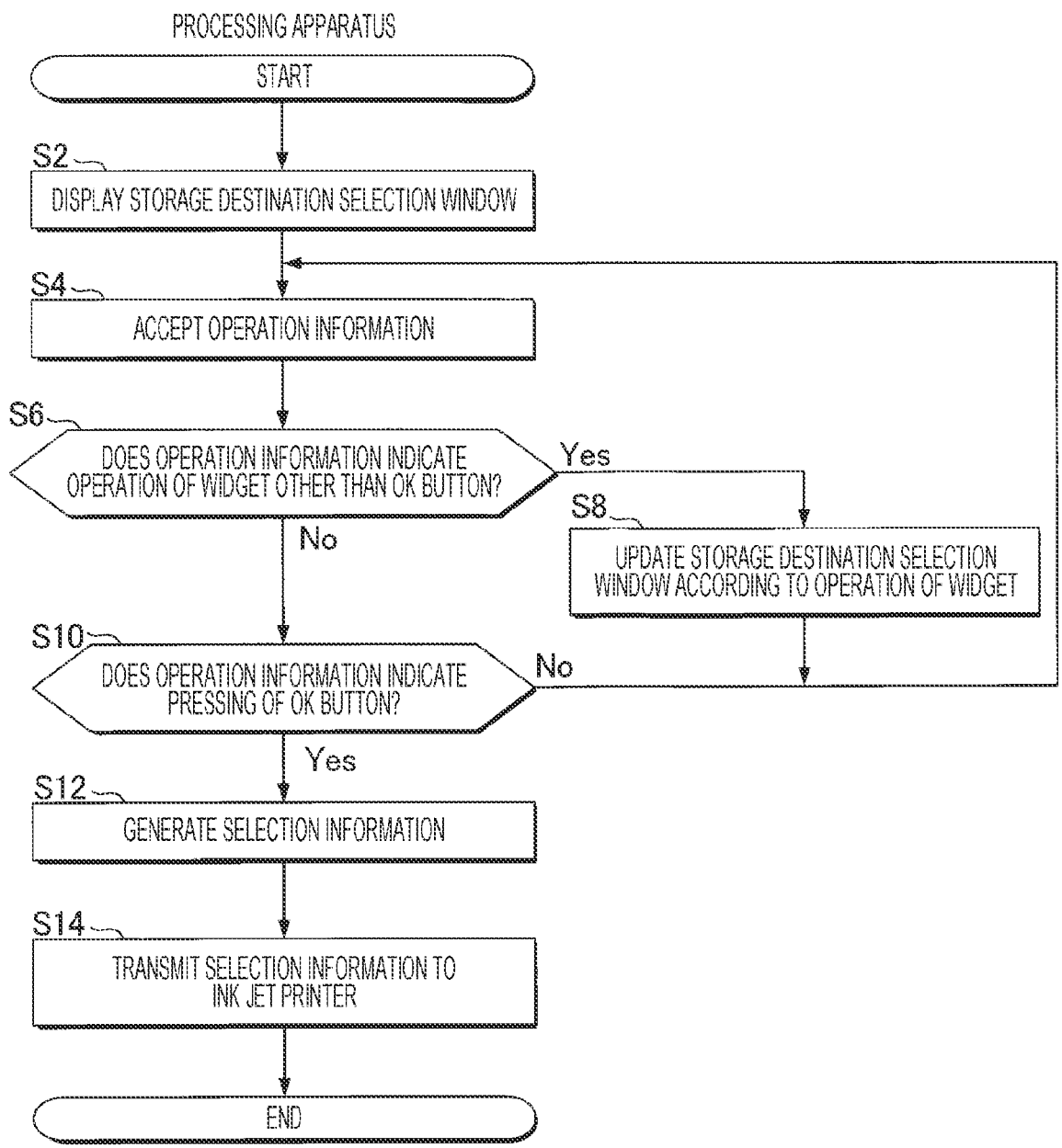
FIG. 8 is a flowchart illustrating an example of a selection information acceptance process.

FIG. 8 is a flowchart illustrating an example of the selection information acceptance process. For example, the control circuit 210 performs the selection information acceptance process when the ink jet program PM2 is executed for the first time after the ink jet program PM2 is installed in the processing apparatus 200. However, the selection information acceptance process may be performed when an instruction to perform the selection information acceptance process is accepted by an operation of the user U.

In step S2, the control circuit 210 causes the display device 270 to display a storage destination selection window HW. The storage destination selection window HW is described with reference to FIG. 9.

Figure 9:
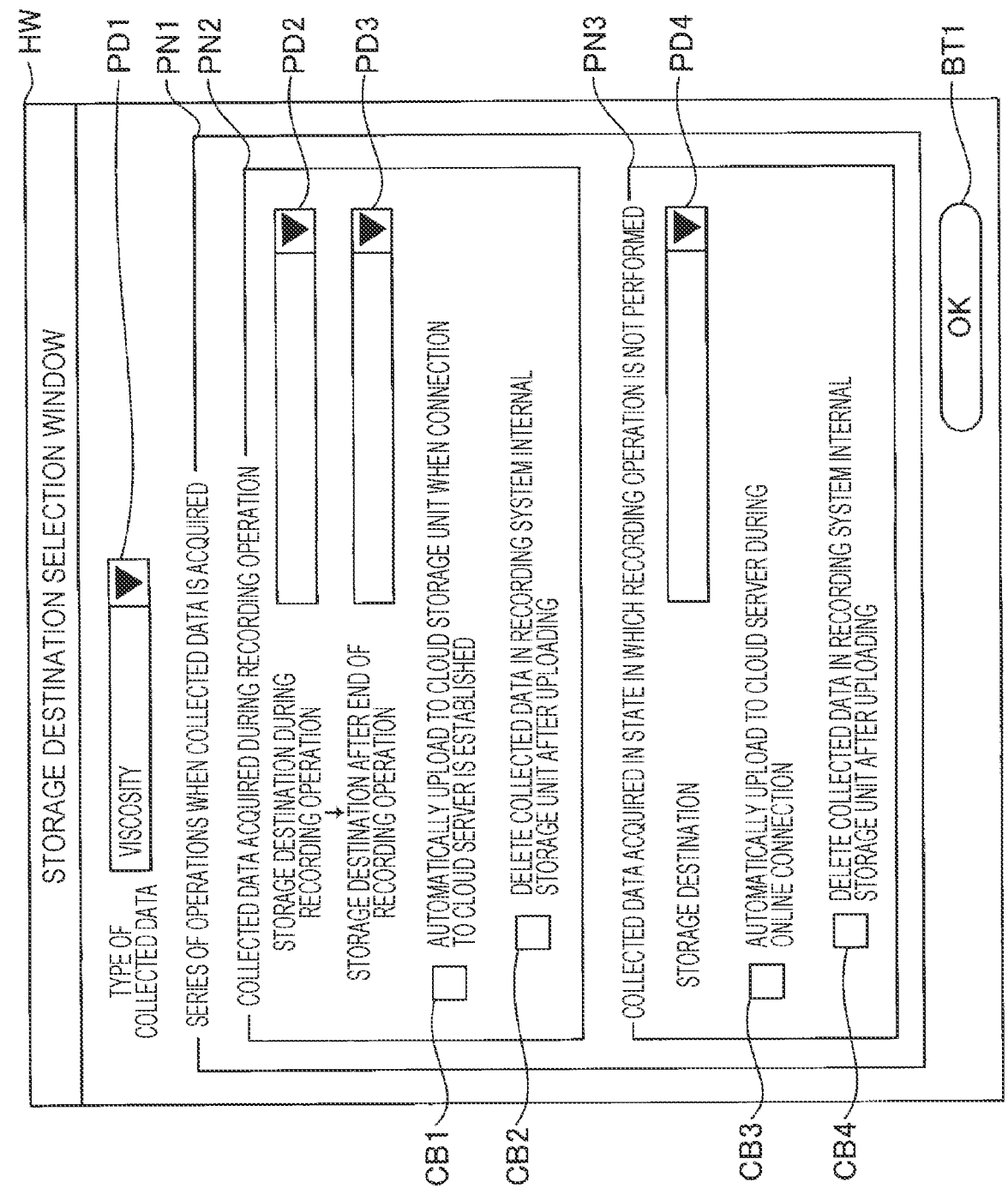
FIG. 9 is a diagram illustrating an example of a storage destination selection window according to the first embodiment.

FIG. 9 is a diagram illustrating an example of the storage destination selection window HW. The storage destination selection window HW is a window on which a storage destination can be selected for each piece of the collected data CD. The storage destination selection window HW includes a pulldown menu PD1 for selecting a type of collected data CD, a pane PN1 including a widget for setting a series of operations when collected data is acquired, and an OK button BT1 for generating selection information CI based on an operation result of the user U. The pane PN1 includes a pane PN2 including a widget for setting a storage destination of collected data CD acquired during the recording operation, and a pane PN3 including a widget for setting a storage destination of collected data CD acquired in a state in which the recording operation is not performed. In the example illustrated in FIG. 9, as an initial state, a character string indicating the temperature is displayed in the pulldown menu PD1. The collected data CD acquired during the recording operation is, for example, the temperature information KT1, the humidity information KT2, the viscosity information NND, and the number of times that the drive elements 111f are driven. The collected data CD acquired in a state in which the recording operation is not performed is, for example, the temperature information KT1 and the humidity information KT2. Therefore, it can be said that any information out of the temperature information KT1 and the humidity information KT2 is an example of "third data".

The pane PN2 includes a pulldown menu PD2, a pulldown menu PD3, a checkbox CB1, and a checkbox CB2. The pulldown menu PD2 is a widget for enabling selection of a storage destination of the collected data CD acquired during the recording operation. The pulldown menu PD3 is a widget for enabling selection of a storage destination of the collected data acquired when the recording operation ends and the storage destination transitions to a storage destination after the recording operation. The checkbox CB1 is a widget for enabling selection as to whether to automatically upload the collected data CD acquired during the recording operation to the cloud storage unit CM when a connection to one or more of the cloud servers CS is established. The checkbox CB2 is a widget for enabling selection as to whether to delete the collected data CD stored in the recording system internal storage unit KM after the collected data CD acquired during the recording operation is uploaded to the cloud storage unit CM.

The pane PN3 includes a pulldown menu PD4, a checkbox CB3, and a checkbox CB4. The pulldown menu PD4 is a widget for enabling selection of a storage destination of the collected data CD acquired in a state in which the recording operation is not performed. The checkbox CB3 is a widget for enabling selection as to whether to automatically upload the collected data CD acquired in a state in which the recording operation is not performed to the cloud storage unit CM when a connection to one or more of the cloud servers CS is established. The checkbox CB4 is a widget for enabling selection as to whether to delete the collected data CD stored in the recording system internal storage unit KM after the collected data CD acquired in a state in which the recording operation is not performed is uploaded to the cloud storage unit CM.

The pulldown menus PD1 to PD4 and the checkboxes CB1 to CB4 can be individually set for each of the plurality of pieces of collected data CD.

Return to FIG. 8. After the end of the processing in step S2, the control circuit 210 that functions as the accepting section 213 accepts operation information according to an operation of the input device 260 by the user U in step S4. After the end of the processing in step S4, the control circuit 210 determines whether the operation information indicates an operation of any widget among the widgets other than the OK button BT1 in step S6. The widgets other than the OK button BT1 are the pulldown menus PD1 to PD4 and the checkboxes CB1 to CB4.

When the result of the determination in step S6 is affirmative, the control circuit 210 updates the storage destination selection window HW according to the operation of the widget in step S8.

Figure 10:
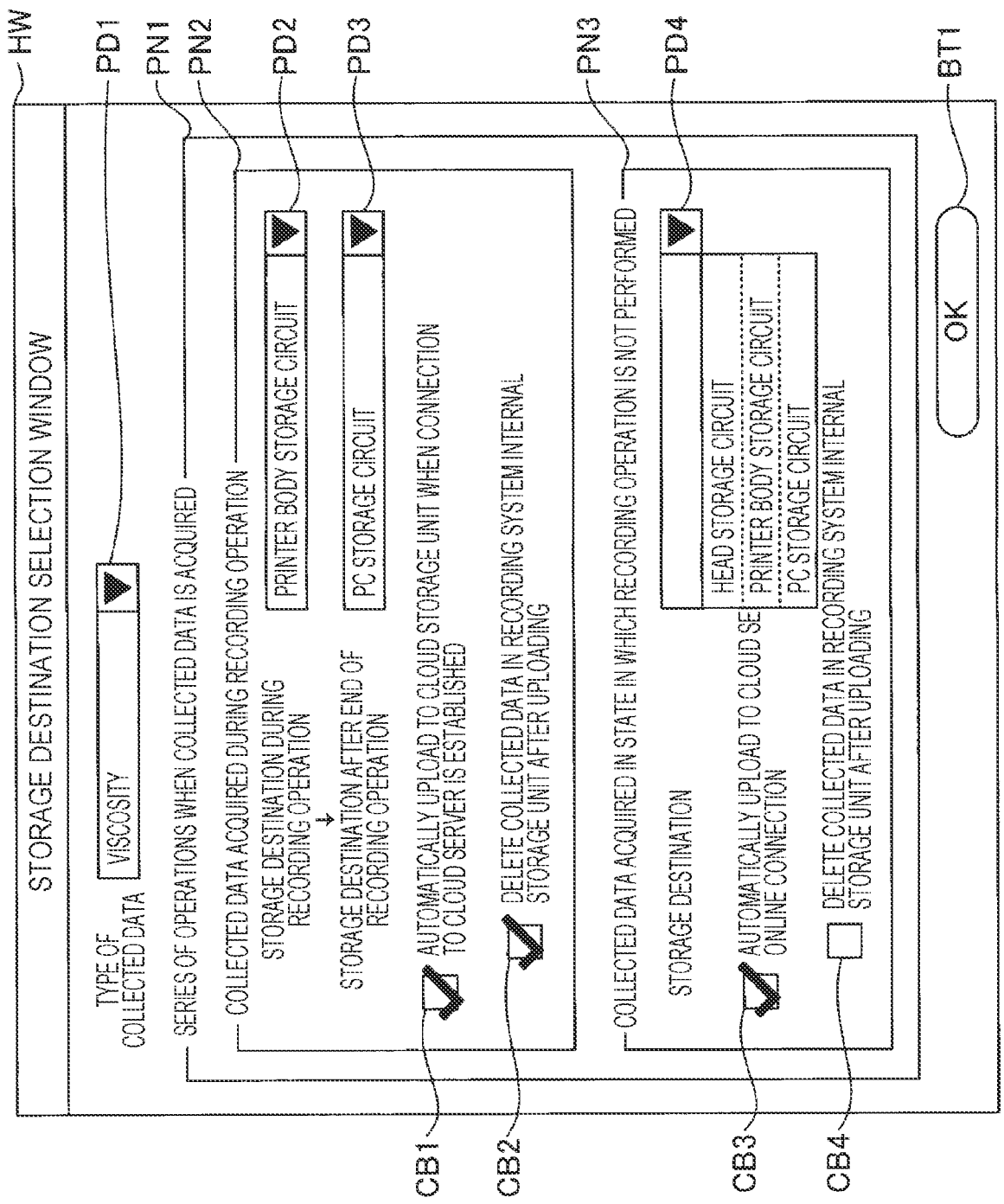
FIG. 10 is a diagram illustrating an example of an update of the storage destination selection window according to the first embodiment.

FIG. 10 is a diagram illustrating an example of the update of the storage destination selection window HW. As an example of the processing in step S8, when the operation information indicates pressing of the pulldown menu PD1, character strings indicating the plurality of pieces of collected data CD are displayed. The character strings indicating the plurality of pieces of collected data CD are, for example, a character string indicating the temperature, a character string indicating the humidity, a character string indicating the viscosity, and a character string indicating the number of times that the drive elements 111f are driven. When the operation information indicates pressing of any one of the plurality of character strings displayed by pressing the pulldown menu PD1, the pressed character string is displayed in a region on the left side in the pulldown menu PD1. When the operation information indicates pressing of any one of the pulldown menus PD2 to PD4, the display device 270 displays a list of two or more candidates for a storage destination among the head storage circuit 185, the printer body storage circuit 160, and the PC storage circuit 220. In the example illustrated in FIG. 10, when the operation information indicates pressing of any one of the pulldown menus PD2 to PD4, the display device 270 displays a list indicating the head storage circuit 185, the printer body storage circuit 160, and the PC storage circuit 220. When the operation information indicates pressing of any one of the checkboxes CB1 to CB4, the pressed checkbox is selected or deselected.

The storage destination selection window HW illustrated in FIG. 10 indicates a state in which the processing in step S8 was performed a plurality of times. The example illustrated in FIG. 10 indicates a state in which the character string indicating the viscosity is displayed in the pulldown menu PD1, a character string indicating the printer body storage circuit 160 is displayed in the pulldown menu PD2, a character string indicating the PC storage circuit 220 is displayed in the pulldown menu PD3, the checkboxes CB1 to CB3 are selected, and the pulldown menu PD4 is pressed.

After the end of the processing in step S8, the control circuit 210 causes the process to return to step S4. When the result of the determination in step S6 is negative, the control circuit 210 determines whether the operation information indicates pressing of the OK button BT1 in step S10. When the result of the determination in step S10 is negative, the control circuit 210 causes the process to return to step S4.

When the result of the determination in step S10 is affirmative, the control circuit 210 that functions as the accepting section 213 generates selection information CI based on the displayed content of the storage destination selection window HW in step S12. Specifically, the accepting section 213 generates, for each piece of the collected data CD, the selection information CI including a character string displayed in each of the pulldown menus PD1 to PD4, and information indicating whether each of the checkboxes CB1 to CB4 is selected. The selection information CI of the "first data" among the temperature information KT1, the humidity information KT2, the viscosity information NND, and the number of times that the drive elements 111f are driven corresponds to "first selection information", and the selection information CI of the "second data" other than the "first data" corresponds to "second selection information". After the end of the processing in step S12, the control circuit 210 controls the communication device 240 to transmit the selection information CI to the ink jet printer 100 in step S14. When the ink jet printer 100 receives the selection information CI, the control circuit 170 stores the selection information CI to the printer body storage circuit 160. After the end of the processing in step S14, the control circuit 210 ends the process illustrated in FIG. 8.

As is understood from FIGS. 8 to 10, the selection information CI indicates a result of having the user U select any one or more of the recording system internal storage unit KM and the cloud storage unit CM to store the collected data CD. For example, it is assumed that the user U presses the OK button BT1 in a state in which the user U selects certain collected data CD and specifies any storage unit included in the recording system internal storage unit KM in the pulldown menu PD2. In this assumption, the selection information CI generated by the processing in step S12 indicates a result of having the user U select the recording system internal storage unit KM to store the collected data CD.

In addition, it is assumed that the user U presses the OK button BT1 in a state in which the user U specifies any storage unit included in the recording system internal storage unit KM in the pulldown menu PD2, selects the checkbox CB1, and does not select the checkbox CB2. In this assumption, the selection information CI generated by the processing in step S12 indicates a result of having the user U select both of the recording system internal storage unit KM and the cloud storage unit CM to store the collected data CD.

In addition, it is assumed that the user U presses the OK button BT1 in a state in which the user U specifies any storage unit included in the recording system internal storage unit KM in the pulldown menu PD2 and selects the checkbox CB1 and the checkbox CB2. In this assumption, the selection information CI generated by the processing in step S12 indicates a result of having the user U select the cloud storage unit CM to store the collected data CD.

As described above, the recording system internal storage unit KM includes the head storage circuit 185, the printer body storage unit 160, and the PC storage circuit 220. Therefore, it can be said that the selection information CI indicates a result of having the user U select any one or more of the head storage circuit 185, the printer body storage circuit 160, the PC storage circuit 220, and the cloud storage unit CM to store the collected data CD.

Figure 11:
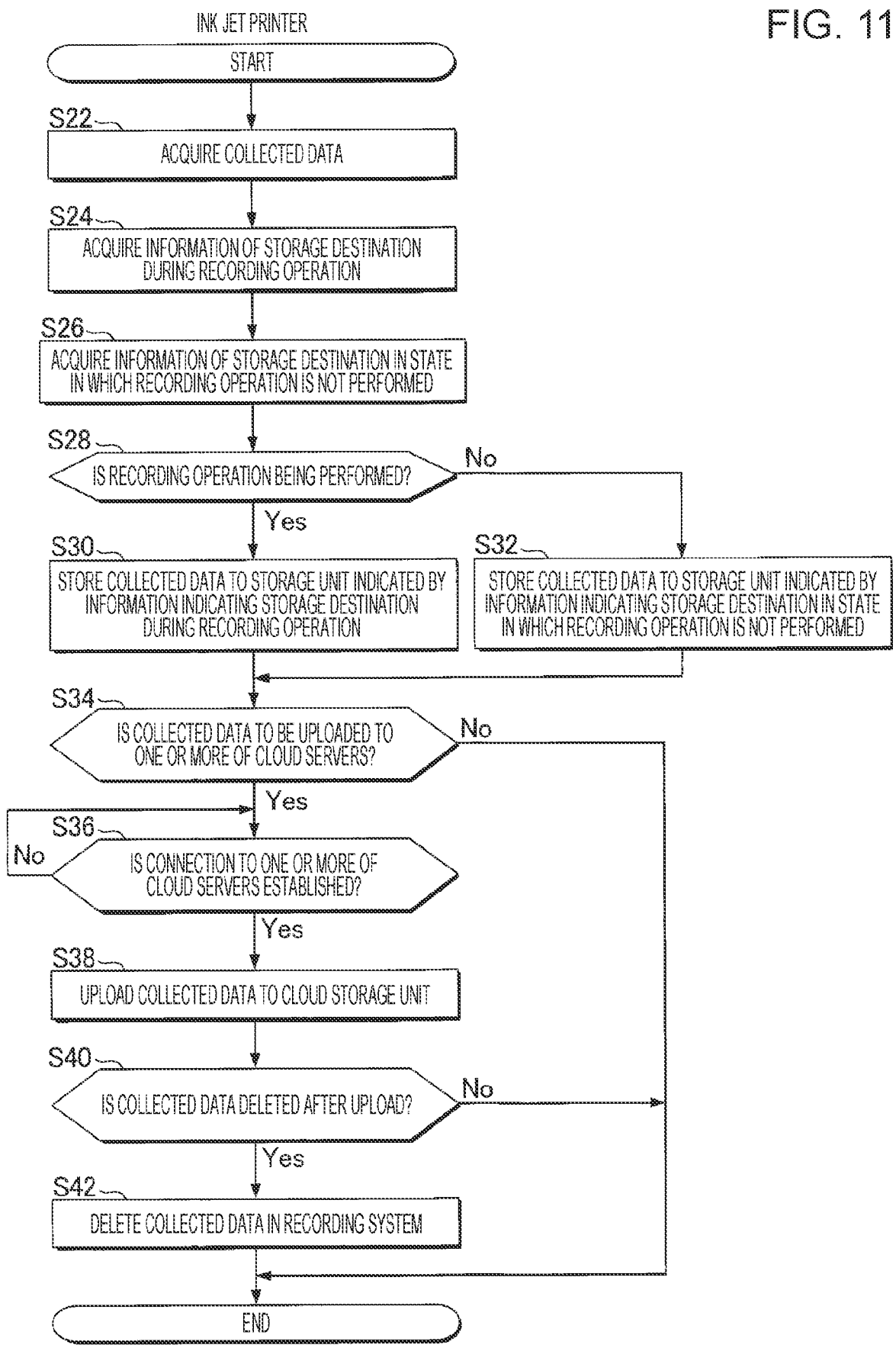
FIG. 11 is a flowchart illustrating an example of a process when collected data is acquired.

FIG. 11 is a flowchart illustrating an example of the process when the collected data is acquired. The process when the collected data is acquired is performed, in other words, the collected data CD is acquired when a predetermined time period ends. The predetermined time period is a value determined by the head manufacturer, the printer manufacturer, or the user U. The same predetermined time period may be determined for each of the plurality of pieces of collected data CD. Alternatively, predetermined time periods that differ for each of the plurality of pieces of collected data CD may be determined. The flowchart illustrated in FIG. 11 is a flowchart when any one of the plurality of pieces of collected data CD is acquired.

In step S22, the control circuit 170 that functions as the acquiring section 171 acquires collected data CD. For example, when the temperature information KT1 is to be acquired as one piece of the collected data CD, the control circuit 170 acquires the temperature information KT1 from the temperature sensor 195. When the humidity information KT2 is to be acquired as one piece of the collected data CD, the control circuit 170 acquires the humidity information KT2 from the humidity sensor 197.

In addition, when the viscosity information NND is to be acquired as one piece of the collected data CD, the control circuit 170 performs the viscosity estimation processing and acquires, from the estimating unit 190, the viscosity information NND that is a result of the viscosity estimation processing. When the viscosity information NND is to be acquired as one piece of the collected data CD, the control circuit 170 may cause a residual vibration in each of the plurality of drive elements 111f and acquire a plurality of pieces of obtained viscosity information NND, or may cause a residual vibration in any one of the plurality of drive elements 111*f* and acquire obtained viscosity information NND.

In addition, when the number of times that the drive elements 111*f* are driven is to be acquired as one piece of the collected data CD, the control circuit 210 acquires, from the printer body storage circuit 160, the number of times that the drive elements 111*f* are driven. To acquire the number of times that the drive elements 111*f* are driven, the control circuit 210 stores, to the printer body storage circuit 160, a result of counting the number of times that the drive elements 111*f* are driven. For example, the control circuit 170 updates the number of times that the drive elements 111*f* are driven every time the control circuit 170 generates a print signal S1 specifying supply of the drive signal Com to the drive elements 111*f*.

After the end of the processing in step S22, the control circuit 170 acquires information that indicates a storage destination during the recording operation in step S24. The information that indicates the storage destination during the recording operation is information included in the selection information CI and corresponding to the displayed content of the pulldown menu PD2 of the storage destination selection window HW. For example, the information that indicates the storage destination during the recording operation indicates the printer body storage circuit 160 in the example illustrated in FIG. 10. Subsequently, the control circuit 170 acquires information that indicates a storage destination in a state in which the recording operation is not performed in step S26. The information that indicates the storage destination in a state in which the recording operation is not performed is information included in the selection information CI and corresponding to the displayed content of the pulldown menu PD4 of the storage destination selection window HW. In the present embodiment, it is assumed that each of the information that indicates the storage destination during the recording operation and the information that indicates the storage destination in a state in which the recording operation is not performed indicates a storage unit included in the recording system internal storage unit KM.

It is assumed that the selection information acceptance process is already performed at the time of the execution of the processing in step S24. Therefore, the ink jet system 10 according to the present embodiment executes the acquiring section 171 after executing the accepting section 213, but may execute the accepting section 213 after executing the acquiring section 171. For example, when the selection information CI is not stored in the printer body storage circuit 160 at the time of the execution of the processing in step S24, the control circuit 170 may cause the processing apparatus 200 to perform the selection information acceptance process. That is, the ink jet system 10 according to the present embodiment may execute the accepting section 213 after executing the acquiring section 171.

After the end of the processing in step S26, the control circuit 170 determines whether the recording operation is being performed in step S28. When the result of the determination in step S28 is affirmative, the control circuit 170 that functions as the storing section 175 stores the collected data CD to the storage unit indicated by the information that indicates the storage destination during the recording operation in step S30. On the other hand, when the result of the determination in step S28 is negative, in other words, in a state in which the recording operation is not performed, the control circuit 170 that functions as the storing section 175 stores the collected data CD to the storage unit indicated by the information that indicates the storage destination in a state in which the recording operation is not performed in step S32.

In step S30 and step S32, when the storage unit indicated by the information that indicates the storage destination during the recording operation or the storage unit indicated by the information that indicates the storage destination in a state in which the recording operation is not performed indicates the PC storage circuit 220, the control circuit 170 transmits the collected data CD to the processing apparatus 200 and instructs the processing apparatus 200 to store the collected data CD to the PC storage circuit 220.

After the end of the processing in step S30 or after the end of the processing in step S32, the control circuit 170 determines whether to upload the collected data CD to one or more of the cloud servers CS in step S34. Specifically, during the recording operation, when information included in the selection information CI and corresponding to the checkbox CB1 of the storage destination selection window HW indicates that the checkbox CB1 is being selected, the control circuit 170 determines that the result of the determination in step S34 is affirmative. During the recording operation, when the information corresponding to the checkbox CB1 indicates that the checkbox CB1 is not being selected, the control circuit 170 determines that the result of the determination in step S34 is negative. In addition, in a state in which the recording operation is not performed, when information included in the selection information CI and corresponding to the checkbox CB3 of the storage destination selection window HW indicates that the checkbox CB3 is being selected, the control circuit 170 determines that the result of the determination in step S34 is affirmative. In a state in which the recording operation is not performed, when the information corresponding to the checkbox CB3 indicates that the checkbox CB3 is not being selected, the control circuit 170 determines that the result of the determination in step S34 is negative.

When the result of the determination in step S34 is negative, the control circuit 170 ends the process illustrated in FIG. 11. When the result of the determination in step S34 is affirmative, the control circuit 170 determines whether a connection to one or more of the cloud servers CS is established in step S36. For example, the control circuit 170 causes the processing apparatus 200 to check whether a connection to one or more of the cloud servers CS is established. When a TCP connection to one or more of the cloud servers CS is established via the communication device 230, the control circuit 210 of the processing apparatus 200 determines that a connection to one or more of the cloud servers CS is established. When the TCP connection fails, the control circuit 210 determines that a connection to one or more of the cloud servers CS is interrupted. TCP is an abbreviation for Transmission Control Protocol.

When the result of the determination in step S36 is negative, the control circuit 170 performs the processing in step S36 again after a predetermined time period elapses. The predetermined time period is determined by, for example, the head manufacturer, the printer manufacturer, or the user U. However, when the processing in step S36 is performed a predetermined number of times and the result of the determination in step S36 is negative, the control circuit 210 causes the display device 270 in the processing apparatus 200 to display an error message such as a message "The connection to the cloud servers could not be established.", and ends the process illustrated in FIG. 11. The predetermined number of times is determined by, for example, the head manufacturer, the printer manufacturer, or the user U. In addition, when the processing in step S36 is performed less than the predetermined number of times, and the result of the determination in step S36 is affirmative, the result of the determination indicates that a connection between the processing apparatus 200 and the cloud servers CS is temporarily interrupted. Examples of the interruption of the connection between the processing apparatus 200 and the cloud servers CS are temporary congestion of the network NW and a state in which the virtualization program VM is not executed due to maintenance of the server 300 by the server business operator.

When the result of the determination in step S36 is affirmative, the control circuit 170 that functions as the storing section 175 uploads the collected data CD stored in the recording system internal storage unit KM by the processing in step S30 or the processing in step S32 to the cloud storage unit CM via the communication device 150 and the processing apparatus 200 in step S38. It can be said that, in the processing in step S38, the collected data CD stored in the recording system internal storage unit KM is copied to the cloud storage unit CM.

After the end of the processing in step S38, the control circuit 170 determines whether to delete the collected data CD after the upload in step S40. Specifically, during the recording operation, when information included in the selection information CI and corresponding to the checkbox CB2 of the storage destination selection window HW indicates that the checkbox CB2 is being selected, the control circuit 170 determines that the result of the determination in step S40 is affirmative. During the recording operation, when the information corresponding to the checkbox CB2 indicates that the checkbox CB2 is not being selected, the control circuit 170 determines that the result of the determination in step S40 is negative. In addition, in a state in which the recording operation is not performed, when information included in the selection information CI and corresponding to the checkbox CB4 of the storage destination selection window HW indicates that the checkbox C4 is being selected, the control circuit 170 determines that the result of the determination in step S40 is affirmative. In a state in which the recording operation is not performed, when the information corresponding to the checkbox CB4 indicates that the checkbox CB4 is not being selected, the control circuit 170 determines that the result of the determination in step S40 is negative.

When the result of the determination in step S40 is negative, the control circuit 170 ends the process illustrated in FIG. 11. When the result of the determination in step S40 is affirmative, the control circuit 170 deletes the collected data CD in the recording system 20 in step S42. The collected data CD in the recording system 20 is the collected data CD stored by the processing in step S30 or the processing in step S32. After the end of the processing in step S42, the control circuit 170 ends the process illustrated in FIG. 11.

Figure 12:
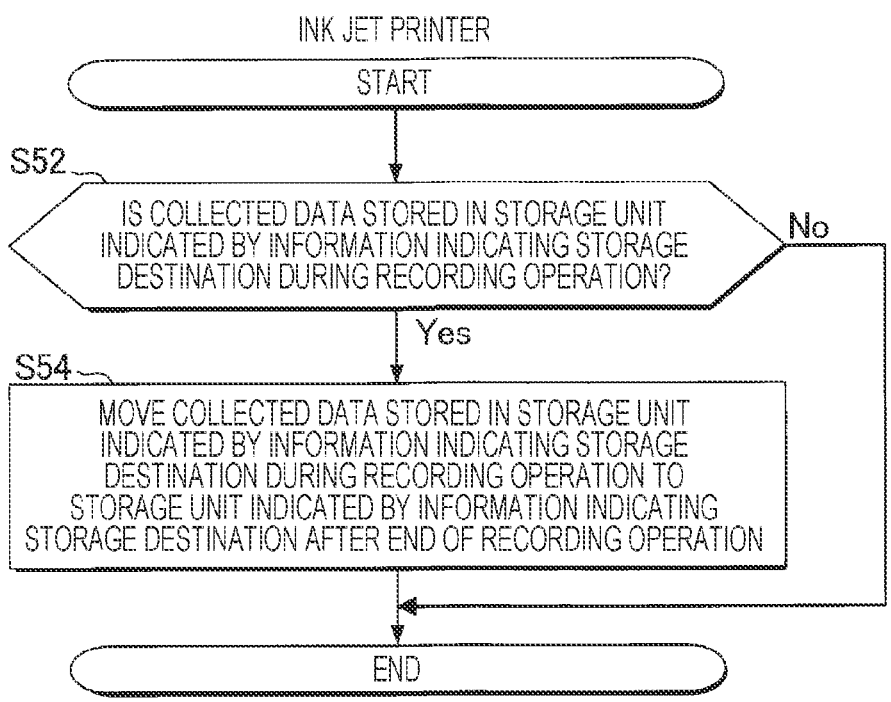
FIG. 12 is a flowchart illustrating an example of a process after a recording operation ends.

FIG. 12 is a flowchart illustrating an example of the process after the recording operation ends. In step S52, the control circuit 170 determines whether the collected data CD is stored in the storage unit indicated by the information that indicates the storage destination during the recording operation.

When the result of the determination in step S52 is affirmative, the control circuit 170 moves the collected data CD stored in the storage unit indicated by the information that indicates the storage destination during the recording operation to a storage unit indicated by information that indicates a storage destination after the end of the recording operation in step S54. The information that indicates the storage destination after the end of the recording operation is information included in the selection information CI and corresponding to the displayed content of the pulldown menu PD3 of the storage destination selection window HW. For example, the information that indicates the storage destination after the end of the recording operation indicates the PC storage circuit 220 in the example illustrated in FIG. 12.

When the result of the determination in step S52 is negative or after the end of the processing in step S54, the control circuit 170 ends the process illustrated in FIG. 12.

According to the flowcharts illustrated in FIGS. 8, 11, and 12, when the recording system 20 is in a state of being connected to one or more of the cloud servers CS, it is possible to reduce the effort of the user U to store the collected data to one or more of the cloud servers CS again by setting the collected data CD to be stored in one or more of the cloud servers CS. Furthermore, in a state in which the recording system 20 is connected to one or more of the cloud servers CS, since the collected data CD is uploaded, the head manufacturer can quickly obtain the collected data CD. Therefore, the head manufacturer can quickly perform analysis using the collected data CD. In addition, during the recording operation, a load of each apparatus in the recording system 20 is high. During the recording operation, the collected data CD can be stored in a storage destination that does not easily affect the load of each apparatus in the recording system 20, for example, the collected data CD can be stored in the printer body storage circuit 160 or the head storage circuit 185. After the recording operation, the collected data CD can be stored in the PC storage circuit 220 or the cloud storage unit CM.

1-7. Summary of First Embodiment

In a summary of the first embodiment, a case is described in which the viscosity information NND and the number of times that the drive elements 111f are driven are collected during the recording operation and the temperature information KT1 is collected in a state in which the recording operation is not performed as an example of the plurality of pieces of collected data CD. To facilitate understanding, selection information CI of the viscosity information NND is referred to as selection information CI-N, selection information CI of the number of times that the drive elements 111f are driven is referred to as selection information CI-D, and selection information CI of the temperature information KT1 is referred to as selection information CI-K. In the summary of the first embodiment, the viscosity information NND is an example of the "first data", the number of times that the drive elements 111f are driven is an example of the "second data", the temperature information KT1 is an example of the "third data", the selection information CI-N is an example of the "first selection information", the selection information CI-D is an example of the "second selection information", and the selection information CI-K is an example of "third selection information".

As described above, the ink jet system 10 includes the ink jet printer 100 to which the head unit HU that ejects the ink is attached, and that performs the recording operation on the recording medium PP, the processing apparatus 200 that is connected to the ink jet printer 100 and performs data processing for causing the ink jet printer 100 to perform the recording operation, and the server 300 connectable to either the ink jet printer 100 or the processing apparatus 200. The recording system internal storage unit KM is disposed in either the ink jet printer 100 or the processing apparatus 200, and the cloud storage unit CM is disposed in the server 300 that functions as the cloud servers CS. The ink jet system 10 includes the acquiring section 171 that acquires the viscosity information NND during the recording operation, the accepting section 213 that accepts the selection information CI-N indicating a result of having the user U to select any one or more of the recording system internal storage unit KM and the cloud storage unit CM to store the viscosity information NND, and the storing section 175 that stores the viscosity information NND to the selected one or more of the recording system internal storage unit KM and the cloud storage unit CM based on the selection information CI-N.

According to the first embodiment, it is possible to store the viscosity information NND to a storage unit optimal for the user, specifically, a storage destination according to how the user U uses the ink jet system 10, by having the user U select any one or more of the recording system internal storage unit KM and the cloud storage unit CM to store the viscosity information NND. Therefore, the ink jet system 10 according to the first embodiment can contribute to improvement of usability for the user U.

In addition, when the selection information CI-N indicates that the viscosity information NND is to be stored in the cloud storage unit CM, and connections of both of the ink jet printer 100 and the processing apparatus 200 to the cloud servers CS are interrupted, the storing section 175 stores the viscosity information NND to the recording system internal storage unit KM. When the selection information CI-N indicates that the viscosity information NND is to be stored in the cloud storage unit CM, and a connection of any one of the ink jet printer 100 and the processing apparatus 200 to one or more of the cloud servers CS is established, the storing section 175 stores the viscosity information NND to the cloud storage unit CM. Explaining with the storage destination selection window HW illustrated in FIG. 9 and the flowchart illustrated in FIG. 11, the selection information CI is generated in a state in which the checkboxes CB1 and CB2 are selected, and the control circuit 170 determines that the result of the determination in step S36 is negative. Even when the result of the determination in step S36 is negative, the viscosity information NND is stored in a storage unit included in the recording system internal storage unit KM in the processing in step S30 or the processing in step S32.

According to the first embodiment, when the selection information CI-N indicates that the viscosity information NND is to be stored in the cloud storage unit CM, and the connection of the recording system 20 to the cloud servers CS is interrupted, it is possible to suppress deletion of the viscosity information NND by storing the viscosity information NND in the recording system internal storage unit KM.

In addition, when the selection information CI-N indicates that the viscosity information NND is to be stored in the cloud storage unit CM and a connection of any one of the ink jet printer 100 and the processing apparatus 200 to one or more of the cloud servers CS is established after being interrupted, the storing section 175 copies the viscosity information NND stored in the recording system internal storage unit KM to the cloud storage unit CM, copies the collected data CD to the cloud storage unit CM, and deletes the viscosity information NND stored in the recording system internal storage unit KM after the copying.

According to the first embodiment, it is possible to increase an available capacity of the recording system internal storage unit KM by deleting the viscosity information NND stored in the recording system internal storage unit KM after copying the viscosity information NND to the cloud storage unit CM.

In addition, a mode may be provided in which when the PC storage circuit 220 is not set as a candidate for a storage destination of the collected data CD, and the operation information indicates pressing of any one of the pulldown menus PD2 to PD4 in the example illustrated in FIG. 10, a list indicating the head storage circuit 185 and the printer body storage circuit 160 is displayed. In this mode, the recording system internal storage unit KM includes the head storage circuit 185 disposed in the head unit HU and the printer body storage circuit 160 included in the ink jet printer 100 and not disposed in the head unit HU, and the selection information CI-N indicates a result of having the user U select any one or more of the head storage circuit 185, the printer body storage circuit 160, and the cloud storage unit CM to store the viscosity information NND, and the storing section 175 stores the viscosity information NND to the selected one or more of the head storage circuit 185, the printer body storage circuit 160, and the cloud storage unit CM based on the selection information CI-N.

According to the first embodiment, it is possible to store the viscosity information NND to any one or more of the head storage circuit 185, the printer body storage circuit 160, and the cloud storage unit CM according to the usage mode of the ink jet system 10 used by the user U. Specifically, when the ink jet system 10 is used in the first usage mode described above, the ink jet system 10 can use the viscosity information NND by storing the viscosity information NND to the head storage circuit 185 even after the printer body to which the head unit HU is attached is switched. In addition, when the ink jet system 10 is used in the second usage mode described above, the ink jet system 10 can use the viscosity information NND by storing the viscosity information NND to the printer body storage circuit 160 even after the head unit HU attached to the printer body is switched.

In addition, a mode may be provided in which when the head storage circuit 185 is not set as a candidate for a storage destination of the collected data CD, and the operation information indicates pressing of any one of the pulldown menus PD2 to PD4 in the example illustrated in FIG. 10, a list indicating the printer body storage circuit 160 and the PC storage circuit 220 is displayed. In this mode, the recording system internal storage unit KM includes the printer body storage circuit 160 and the PC storage circuit 220 disposed in the processing apparatus 200, the selection information CI-N indicates a result of having the user U select any one or more of the printer body storage circuit 160, the PC storage circuit 220, and the cloud storage unit CM to store the viscosity information NND, and the storing section 175 stores the viscosity information NND to the selected one or more of the printer body storage circuit 160, the PC storage circuit 220, and the cloud storage unit CM based on the selection information CI-N.

According to the first embodiment, it is possible to store the viscosity information NND to any one or more of the printer body storage circuit 160, the PC storage circuit 220, and the cloud storage unit CM according to the usage mode of the ink jet system 10 used by the user U. Specifically, when the ink jet system 10 is used in the third usage mode described above, the ink jet system 10 can use the viscosity information NND by storing the viscosity information NND in the PC storage circuit 220 even after the ink jet printer 100 connected to the processing apparatus 200 is switched.

In addition, a mode may be provided in which when the printer body storage circuit 160 is not set as a candidate for a storage destination of the collected data CD, and the operation information indicates pressing of any one of the pulldown menus PD2 to PD4 in the example illustrated in FIG. 10, a list indicating the head storage circuit 185 and the PC storage circuit 220 is displayed. In this mode, the recording system internal storage unit KM includes the head storage circuit 185 and the PC storage circuit 220, the selection information CI-N indicates a result of having the user U select any one or more of the head storage circuit 185, the PC storage circuit 220, and the cloud storage unit CM to store the viscosity information NND, and the storing section 175 stores the viscosity information NND to the selected one or more of the head storage circuit 185, the PC storage circuit 220, and the cloud storage unit CM based on the selection information CI-N.

According to the first embodiment, it is possible to store the viscosity information NND to any one or more of the head storage circuit 185, the PC storage circuit 220, and the cloud storage unit CM according to the usage mode of the ink jet system 10 used by the user U.

The acquiring section 171 acquires the viscosity information NND and the number of times that the drive elements 111$f$ are driven that is different from the viscosity information NND during the recording operation, the accepting section 213 accepts the selection information CI-N and the selection information CI-D indicating a result of having the user U select any one or more of the recording system internal storage unit KM and the cloud storage unit CM to store the number of times that the drive elements 111$f$ are driven, and the storing section 175 stores, to the selected one or more of the recording system internal storage unit KM and the cloud storage unit CM based on the selection information CI-D, the number of times that the drive elements 111$f$ are driven.

According to the first embodiment, it is possible to change a storage destination for each type of the collected data CD. In other words, the ink jet system 10 can individually set a storage destination for each type of the collected data CD.

In addition, the ink jet printer 100 includes the temperature sensor 195, and the collected data CD may be the temperature information KT1 indicating the result of the measurement by the temperature sensor 195.

According to the first embodiment, it is possible to store the temperature information KT1 to any one or more of the recording system internal storage unit KM and the cloud storage unit CM according to the usage mode of the ink jet system 10 used by the user U.

In addition, the ink jet printer 100 includes the humidity sensor 197, and the collected data CD may be the humidity information KT2 indicating the result of the measurement by the humidity sensor 197.

According to the first embodiment, it is possible to store the humidity information KT2 to any one or more of the recording system internal storage unit KM and the cloud storage unit CM according to the usage mode of the ink jet system 10 used by the user U.

In addition, the head unit HU includes the drive elements 111$f$, the pressure chambers CV, and the nozzles N. The drive elements 111$f$ are piezoelectric elements that are deformed by the supply of the drive signal Com. The pressure in the pressure chambers CV increases or decreases due to the deformation of the drive elements 111$f$. The nozzles N communicate with the pressure chambers CV, and the ink is ejected from the nozzles N. The collected data CD may be the viscosity information NND based on residual vibrations that occur in the pressure chambers CV after the drive signal Com is supplied to the drive elements 111$f$.

According to the first embodiment, it is possible to store the viscosity information NND to any one or more of the recording system internal storage unit KM and the cloud storage unit CM according to the usage mode of the ink jet system 10 used by the user U.

In addition, the head unit HU includes the drive elements 111$f$ that are driven by the supply of the drive signal Com, and the collected data CD may be the number of times that the drive elements 111$f$ are driven.

According to the first embodiment, the number of times that the drive elements 111$f$ are driven can be stored to any one or more of the recording system internal storage unit KM and the cloud storage unit CM according to the usage mode of the ink jet system 10 used by the user U.

The acquiring section 171 further acquires the temperature information KT1 different from the viscosity information NND in a state in which the recording operation is not performed, the accepting section 213 further accepts the selection information CI-K indicating a result of having the user U select any one or more of the recording system internal storage unit KM and the cloud storage unit CM to store the temperature information KT1, and the storing section 175 stores the temperature information KT1 to the selected one or more of the recording system internal storage unit KM and the cloud storage unit CM based on the selection information CI-K.

According to the first embodiment, it is possible to store the collected data acquired in a state in which the recording operation is not performed to any one or more of the recording system internal storage unit KM and the cloud storage unit CM according to the usage mode of the ink jet system 10 used by the user U.

2. Second Embodiment

The storage destination selection window HW is not limited to the modes illustrated in FIGS. 9 and 10. A storage destination selection window HW-A according to a second embodiment is described below with reference to FIG. 13.

Figure 13:
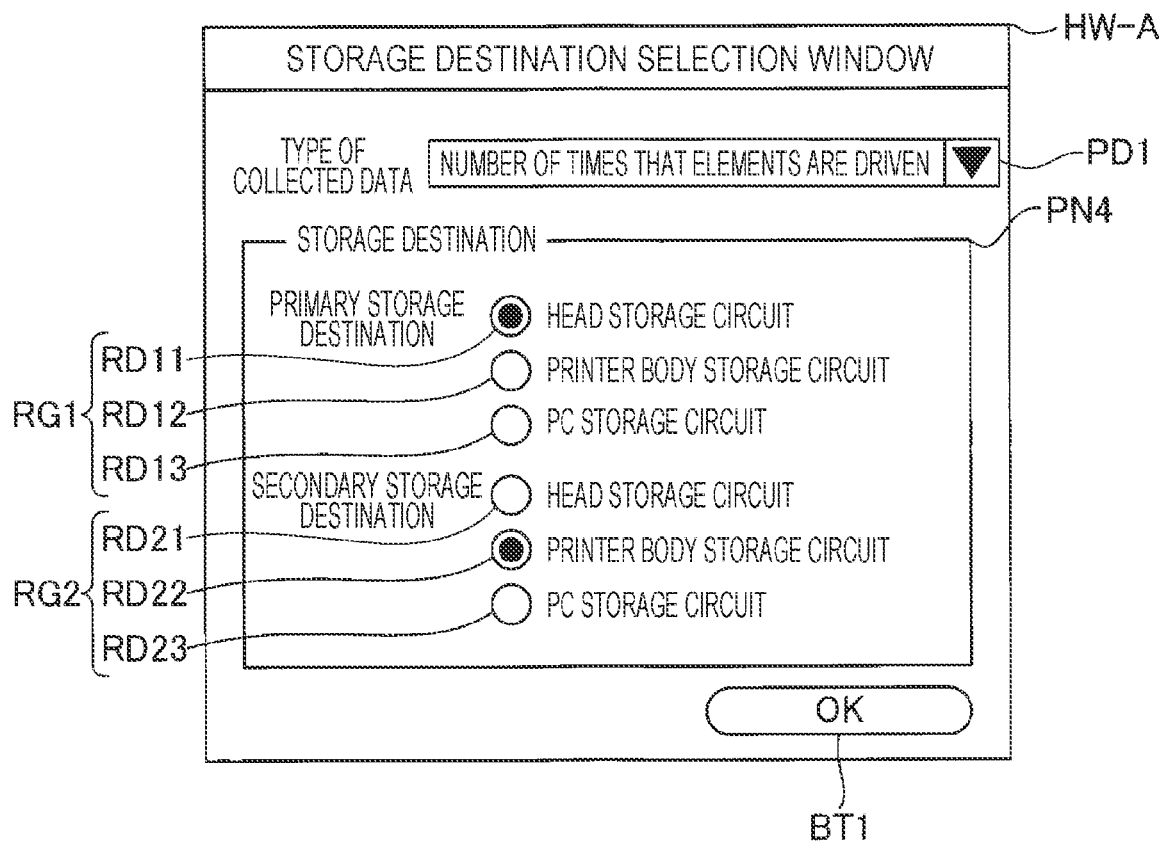
FIG. 13 is a diagram illustrating an example of a storage destination selection window according to a second embodiment.

FIG. 13 is a diagram illustrating an example of the storage destination selection window HW-A. The storage destination selection window HW-A is different from the storage destination selection window HW in that the storage destination selection window HW-A has a pane PN4 instead of the pane PN1.

The pane PN4 includes a radio button group RG1 for setting a primary storage destination, and a radio button group RG2 for setting a secondary storage destination. The primary storage destination is a storage destination of collected data CD when the collected data CD is acquired in a state in which a load of each apparatus in a recording system 20 during the execution of a recording operation or the like is high. The secondary storage selection is a storage destination of collected data CD when the load of each apparatus in the recording system 20 decreases to a low level from a high level after the end of the recording operation or the like.

The radio button group RG1 includes a radio button RD11 for setting a primary storage destination of currently selected collected data CD to a head storage circuit 185, a radio button RD 12 for setting a primary storage destination of currently selected collected data CD to a printer body storage circuit 160, and a radio button RD 13 for setting a primary storage destination of currently selected collected data CD to a PC storage circuit 220. When any one of the radio buttons RD11 to RD13 is selected, the other radio buttons are deselected. The radio button group RG2 includes a radio button RD21 for setting a secondary storage destination of currently selected collected data CD to the head storage circuit 185, a radio button RD 22 for setting a secondary storage destination of currently selected collected data CD to the printer body storage circuit 160, and a radio button RD 23 for setting a secondary storage destination of currently selected collected data CD to the PC storage circuit 220. When any one of the radio buttons RD21 to RD23 is selected, the other radio buttons are deselected.

The radio button group RG2 illustrated in FIG. 13 may include a radio button for setting a secondary storage destination of currently selected collected data CD to a cloud storage unit CM.

As described above, the storage destination selection window HW-A illustrated in FIG. 13 includes the radio button group RG1 for setting the primary storage destination and the radio button group RG2 for selecting the secondary storage destination. However, a mode may be provided in which the storage destination selection window HW-A further includes a radio button group for setting a tertiary storage destination in addition to the radio button groups RG1 and RG2. In this mode, the primary storage destination is a storage destination of collected data CD when the collected data CD is acquired in a state in which the load of each apparatus in the recording system during the execution of the recording operation or the like is high. The secondary storage destination is a storage destination of collected data CD in a state in which the load of each apparatus in the recording system 20 during the execution of the recording operation or the like changes to a middle level. The tertiary storage destination is a storage destination of collected data CD in a state in which the load of each apparatus in the recording system 20 during the execution of the recording operation or the like decreases to a low level from the middle level.

3. Third Embodiment

The first embodiment and the second embodiment describe the case where the collected data CD acquired in a state in which the load of each apparatus in the recording system 20 is high is moved when the load of each apparatus in the recording system 20 decreases, but the present disclosure is not limited thereto. In a third embodiment, collected data CD is not moved even when a load of each apparatus in a recording system 20 decreases. A storage destination selection window HW-B according to the third embodiment is described with reference to FIG. 14.

Figure 14:
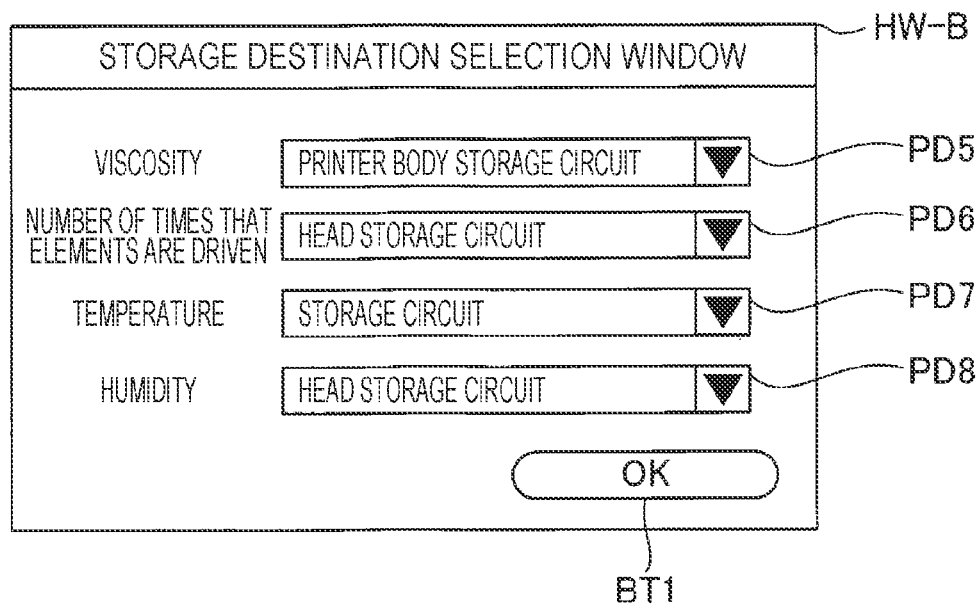
FIG. 14 is a diagram illustrating an example of a storage destination selection window according to a third embodiment.

FIG. 14 is a diagram illustrating an example of the storage destination selection window HW-B. The storage destination selection window HW-B is different from the storage destination selection window HW in that the storage destination selection window HW-B includes pulldown menus PD5 to PD8 instead of the pulldown menu PD1 and the pane PN1.

The pulldown menu PD5 is a widget for selecting a storage destination for storing viscosity information NND. The pulldown menu PD6 is a widget for selecting a storage destination for storing the number of times that drive elements 111f are driven. The pulldown menu PD7 is a widget for selecting a storage destination for storing temperature information KT1. The pulldown menu PD8 is a widget for selecting a storage destination for humidity information KT2. When any one of the pulldown menus PD5 to PD8 is selected, a display device 270 displays a list of two or more candidate storage destinations among a head storage circuit 185, a printer body storage circuit 160, a PC storage circuit 220, and a cloud storage unit CM.

4. Modifications

The embodiments exemplified above may be variously modified. Specific modifications are exemplified below. Two or more modes arbitrarily selected from the following exemplifications may be appropriately combined to the extent that the modes are not mutually inconsistent.

4-1. First Modification

The storage destination selection window HW is not limited to the modes described above. A storage destination selection window HW-C according to a first modification is described below with reference to FIGS. 15 and 16.

Figure 15:
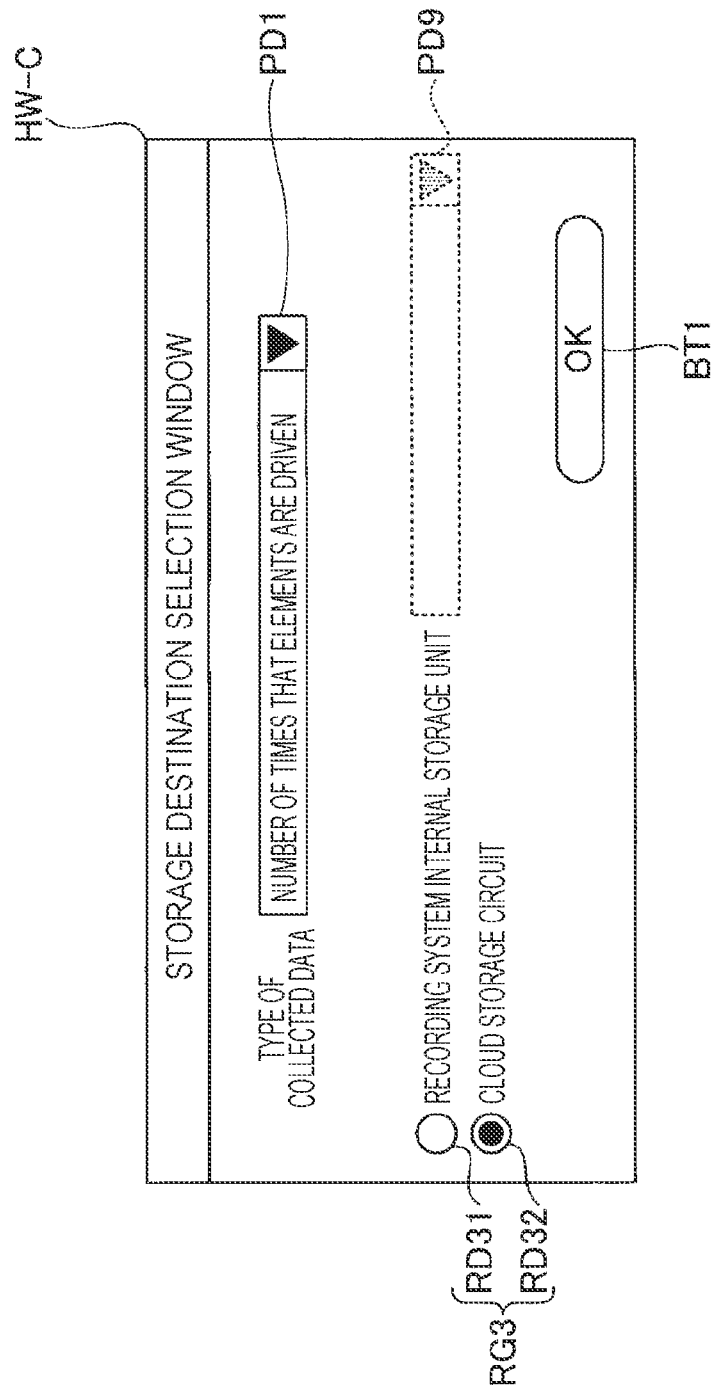
FIG. 15 is a diagram illustrating an example of a storage destination selection window according to a first modification.
Figure 16:
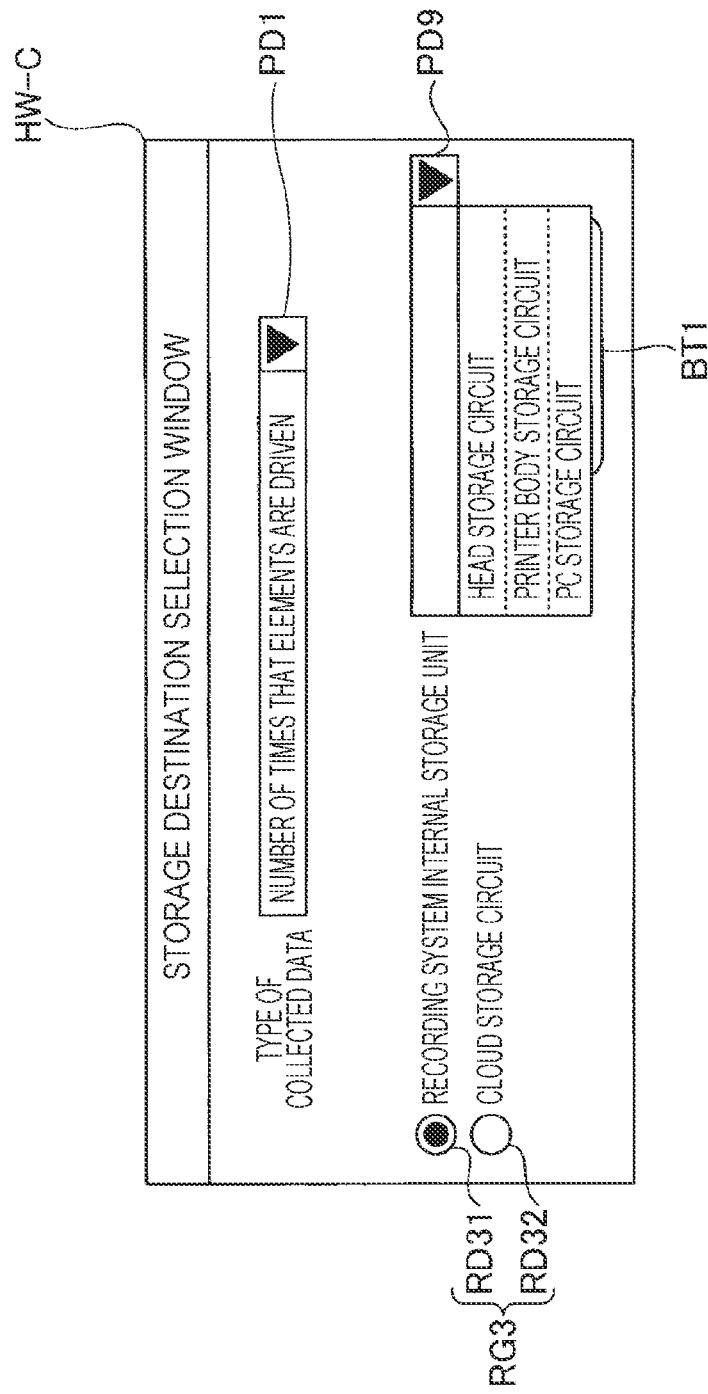
FIG. 16 is a diagram illustrating an example of the storage destination selection window according to the first modification.

FIGS. 15 and 16 are diagrams illustrating examples of the storage destination selection window HW-C. As illustrated in FIGS. 15 and 16, the storage destination selection window HW-C is different from the storage destination selection window HW in that the storage destination selection window HW-C includes a radio button group RG3 and a pulldown menu PD9 instead of the pane PN1.

The radio button group RG3 includes a radio button RD31 for setting currently selected collected data CD in the recording system internal storage unit KM, and a radio button RD32 for setting currently selected collected data CD in the cloud storage unit CM. When one of the radio buttons RD31 and RD32 is selected, the other radio button is deselected.

The pulldown menu PD9 is a widget for having a user U select any one of the storage units included in the recording system internal storage unit KM to store collected data CD to set the currently selected collected data CD in the recording system internal storage unit KM. As illustrated in FIG. 15, when the radio button RD32 is selected, the pulldown menu PD9 is in a state of not accepting an operation of the user U.

FIG. 16 illustrates a state in which the user U selects the radio button RD31 and presses the pulldown menu PD9. As is understood from FIG. 16, upon accepting an operation of selecting the radio button RD31 by the user U, the control circuit 210 that functions as the accepting section 213 further accepts an operation of the pulldown menu PD9. When the pulldown menu PD9 is pressed, the display device 270 displays two or more candidate storage destinations among the head storage circuit 185, the printer body storage circuit 160, and the PC storage circuit 220.

4-2. Second Modification

In each of the modes described above, the viscosity information NND is an example of data based on a residual vibration, but the data based on the residual vibration is not limited to the viscosity information NND. For example, the data based on the residual vibration may be one or a plurality of pieces of data included in determination information indicating determination as to whether ejection from the nozzles N failed based on amplitudes of residual vibrations, periods of the residual vibrations, rates at which the residual vibrations attenuate, and the residual vibrations.

4-3. Third Modification

In each of the modes described above, the drive elements 111f are piezoelectric elements, but are not limited thereto. For example, the drive elements 111f may be heating elements that convert electric energy to thermal energy and generate air bubbles in the pressure chambers CV by heating so as to change the pressure in the pressure chambers CV. In the second modification, the "heating elements" are an example of "drive elements". The heating elements may be elements in which heaters generate heat by supply of a drive signal Com. In the second modification, in collected data CD, any one of data pieces that are temperature information KT1, humidity information KT2, and the number of times that the drive elements 111f are driven is an example of "first data", and the other data pieces excluding the one data piece is an example of "second data".

4-4. Fourth Modification

In each of the modes described above, the ink jet system 10 individually changes a storage destination for each type of the collected data CD, but is not limited thereto. The ink jet system 10 may have the user U select a common storage destination of all the collected data CD regardless of the types of the collected data CD.

4-5. Fifth Modification

In each of the modes described above, the head unit HU includes the head storage circuit 185, but may not include the head storage circuit 185. When the head unit HU does not include the head storage circuit 185, the recording system internal storage unit KM includes the printer body storage circuit 160 and the PC storage circuit 220.

4-6. Sixth Modification

In each of the modes described above, the ink jet printer 100 is a serial-type ink jet printer that causes the head unit HU to reciprocate in the direction along the X axis. However, the present disclosure is not limited thereto. The ink jet printer 100 may be a line-type liquid ejecting apparatus in which a plurality of nozzles N are distributed over an entire width of the recording medium PP.

4-7. Other Modifications

The ink jet printer 100 described above may be used for various apparatuses such as a dedicated printing apparatus, a facsimile apparatus, and a copying apparatus. The recording apparatus according to the present disclosure is not limited to an apparatus that is used for printing. For example, the recording apparatus according to the present disclosure may be a recording apparatus that ejects a solution of a colorant and is used as a manufacturing apparatus that forms a color filter for a liquid crystal display apparatus. In addition, the recording apparatus according to the present disclosure may be a recording apparatus that ejects a solution of a conductive material and is used as a manufacturing apparatus that forms a wiring and an electrode of a wiring substrate.

What is claimed is:

1. An ink jet system, wherein a first storage unit is disposed in either a recording apparatus or a processing apparatus, a second storage unit is disposed in a server, and the ink jet system further comprises:
   an acquiring section that acquires first data during the recording operation;
   an accepting section that accepts first selection information indicating a result of having a user select any one or more of the first storage unit and the second storage unit to store the first data; and
   a storing section that stores the first data to the selected one or more of the first storage unit and the second storage unit based on the first selection information,
   wherein, when the first selection information indicates that the first data is to be stored to the second storage unit, and connections between both of the recording apparatus and the processing apparatus and the server are interrupted, the storing section stores the first data to the first storage unit, and when the first selection information indicates that the first data is to be stored to the second storage unit and a connection between either the recording apparatus or the processing apparatus and the server is established, the storing section stores the first data to the second storage unit.

2. The ink jet system according to claim 1, wherein when the first selection information indicates that the first data is to be stored to the second storage unit and a connection between either the recording apparatus or the processing apparatus and the server is established after being interrupted, the storing section copies the first data stored in the first storage unit to the second storage unit, and deletes the first data stored in the first storage unit after copying the first data to the second storage unit.

3. The ink jet system according to claim 1, wherein the first storage unit includes a fourth storage unit disposed in the recording apparatus and not disposed in a head unit, and a fifth storage unit disposed in the processing apparatus, the first selection information indicates a result of having the user select any one or more of the fourth storage unit, the fifth storage unit, and the second storage unit to store the first data, and the storing section stores the first data to the selected one or more of the fourth storage unit, the fifth storage unit, and the second storage unit based on the first selection information.

4. The ink jet system according to claim 1, wherein the acquiring section acquires the first data and second data different from the first data during the recording operation, the accepting section accepts the first selection information and second selection information indicating a result of having the user select any one or more of the first storage unit and the second storage unit to store the second data, and the storing section stores the second data to the selected one or more of the first storage unit and the second storage unit based on the second selection information.

5. The ink jet system according to claim 1, wherein the recording apparatus includes a temperature sensor, and the first data indicates a result of measurement by the temperature sensor.

6. The ink jet system according to claim 1, wherein the recording apparatus includes a humidity sensor, and the first data indicates a result of measurement by the humidity sensor.

7. The ink jet system according to claim 1, wherein a head unit includes a piezoelectric element that is deformed by supply of a drive signal, a pressure chamber in which pressure is increased and reduced by the deformation of the piezoelectric element, and a nozzle that communicates with the pressure chamber and from which ink is ejected, and the first data is data based on a residual vibration that occurs in the pressure chamber after the drive signal is supplied to the piezoelectric element.

8. The ink jet system according to claim 1, wherein a head unit includes a drive element that is driven by supply of a drive signal, and the first data indicates the number of times that the drive element is driven.

9. The ink jet system according to claim 1, wherein the acquiring section acquires third data different from the first data in a state in which the recording operation is not performed, the accepting section further accepts third selection information indicating a result of having the user select any one or more of the first storage unit and the second storage unit to store the third data, and the storing section stores the third data to the selected one or more of the first storage unit and the second storage unit based on the third selection information.

10. An ink jet system, wherein a first storage unit is disposed in either a recording apparatus or a processing apparatus, a second storage unit is disposed in a server, and the ink jet system further comprises:

an acquiring section that acquires first data during the record operation;

an acquiring section that accepts first selection information indicating a result of having a user select any one or more of the first storage unit and the second storage unit to store the first data; and a storing section th stores the first data to the selected one or more of the first storage unit and the second storage unit based on the first selection information, wherein the first storage unit includes a third storage unit disposed in a head unit, and a fourth storage unit disposed in the recording apparatus and not disposed in the head unit, the first selection information indicates a result of having the user select any one or more of the third storage unit, the fourth storage unit, and the second storage unit to store the first data, and the storing section stores the first data to the selected one or more of the third storage unit, the fourth storage unit, and the second storage unit based on the first selection information.

11. An ink jet system, wherein a first storage unit is disposed in either a recording apparatus or a processing apparatus, a second storage unit is disposed in a server, and the ink jet system further comprises:

an acquiring section that acquires first data during the recording operation;

an accepting section that accepts first selection information indicating a result of having a user select any one or more of the first storage unit and the second storage unit to store the first data; and a storing section that stores the first data to the selected one or more of the first storage unit and the second storage unit based on the first selection information, wherein the first storage unit includes a third storage unit disposed in a head unit, and a fifth storage unit disposed in the processing apparatus, the first selection information indicates a result of having the user select any one or more of the third storage unit, the fifth storage unit, and the second storage unit to store the first data, and the storing section stores the first data to the selected one or more of the third storage unit, the fifth storage unit, and the second storage unit based on the first selection information.

* * * * *